(12) United States Patent
Ludwig

(10) Patent No.: US 8,712,185 B2
(45) Date of Patent: Apr. 29, 2014

(54) HIGH-ACCURACY CENTERED FRACTIONAL FOURIER TRANSFORM MATRIX FOR OPTICAL IMAGING AND OTHER APPLICATIONS

(71) Applicant: Lester F. Ludwig, Belmont, CA (US)

(72) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

(21) Appl. No.: 13/959,604

(22) Filed: Aug. 5, 2013

(65) Prior Publication Data

US 2013/0322777 A1 Dec. 5, 2013

Related U.S. Application Data

(63) Continuation of application No. 12/945,902, filed on Nov. 15, 2010, now Pat. No. 8,542,945.

(60) Provisional application No. 61/261,358, filed on Nov. 15, 2009.

(51) Int. Cl.
*G06K 9/36* (2006.01)
*G03H 1/16* (2006.01)

(52) U.S. Cl.
USPC ............................................ 382/280; 359/29

(58) Field of Classification Search
USPC ................ 382/254–255, 274–275, 280, 312; 359/29, 31, 279, 560; 709/232; 250/201.9

See application file for complete search history.

(56) References Cited

U.S. PATENT DOCUMENTS

| 7,002,143 B2 * | 2/2006 | Parker et al. .................. 250/282 |
| 7,346,013 B2 * | 3/2008 | Garmany et al. ............. 370/286 |
| 8,285,401 B2 * | 10/2012 | Dean .............................. 700/59 |

* cited by examiner

*Primary Examiner* — Kanjibhai Patel
(74) *Attorney, Agent, or Firm* — Procopio, Cory, Hargreaves & Savitch LLP

(57) ABSTRACT

Methods for numerically generating a centered discrete fractional Fourier transform matrix on a computer, the centered discrete fractional Fourier transform matrix of size N by N where N is an odd integer. Centering is obtained by simple barrel roll operations on eigenvectors. High-accuracy is obtained by numerically calculating the eigenvectors of the discrete fractional Fourier transform matrix from a closed-form mathematical formula and then iteratively performing a Gram-Schmidt orthogonalization procedure until a resulting set of improved-orthogonal eigenvectors is produced that is sufficiently orthogonal.

20 Claims, 17 Drawing Sheets

| n | m(+1) | m(-i) | m(-1) | m(+i) |
|---|---|---|---|---|
| 4 | 2 | 1 | 1 | 0 |
| 5 | 2 | 1 | 1 | 1 |
| 6 | 2 | 1 | 2 | 1 |
| 7 | 2 | 2 | 2 | 1 |
| 8 | 3 | 2 | 2 | 1 |
| 9 | 3 | 2 | 2 | 2 |
| 10 | 3 | 2 | 3 | 2 |
| 11 | 3 | 3 | 3 | 2 |
| 12 | 4 | 3 | 3 | 2 |
| 13 | 4 | 3 | 3 | 3 |
| 14 | 4 | 3 | 4 | 3 |
| 15 | 4 | 4 | 4 | 3 |
| 16 | 5 | 4 | 4 | 3 |
| 17 | 5 | 4 | 4 | 4 |
| 18 | 5 | 4 | 5 | 4 |
| 19 | 5 | 5 | 5 | 4 |
| 20 | 6 | 5 | 5 | 4 |
| 21 | 6 | 5 | 5 | 5 |
| 22 | 6 | 5 | 6 | 5 |
| 23 | 6 | 6 | 6 | 5 |
| 24 | 7 | 6 | 6 | 5 |
| 25 | 7 | 6 | 6 | 6 |
| 26 | 7 | 6 | 7 | 6 |
| 27 | 7 | 7 | 7 | 6 |
| 28 | 8 | 7 | 7 | 6 |
| 29 | 8 | 7 | 7 | 7 |
| 30 | 8 | 7 | 8 | 7 |
| 31 | 8 | 8 | 8 | 7 |
| 32 | 9 | 8 | 8 | 7 |
| 33 | 9 | 8 | 8 | 8 |
| 34 | 9 | 8 | 9 | 8 |
| 35 | 9 | 9 | 9 | 8 |
| 36 | 10 | 9 | 9 | 8 |
| 37 | 10 | 9 | 9 | 9 |
| 38 | 10 | 9 | 10 | 9 |
| 39 | 10 | 10 | 10 | 9 |
| 40 | 11 | 10 | 10 | 9 |
| 41 | 11 | 10 | 10 | 10 |
| 42 | 11 | 10 | 11 | 10 |
| 43 | 11 | 11 | 11 | 10 |
| 44 | 12 | 11 | 11 | 10 |
| 45 | 12 | 11 | 11 | 11 |
| 46 | 12 | 11 | 12 | 11 |
| 47 | 12 | 12 | 12 | 11 |
| 48 | 13 | 12 | 12 | 11 |
| 49 | 13 | 12 | 12 | 12 |
| 50 | 13 | 12 | 13 | 12 |
| 51 | 13 | 13 | 13 | 12 |
| 52 | 14 | 13 | 13 | 12 |
| 53 | 14 | 13 | 13 | 13 |
| 54 | 14 | 13 | 14 | 13 |
| 55 | 14 | 14 | 14 | 13 |
| 56 | 15 | 14 | 14 | 13 |

Figure 12a

| 17 | 5 | 4 | 4 | 4 |
|---|---|---|---|---|
| 18 | 5 | 4 | 5 | 4 |
| 19 | 5 | 5 | 5 | 4 |
| 20 | 6 | 5 | 5 | 4 |
| 21 | 6 | 5 | 5 | 5 |
| 22 | 6 | 5 | 6 | 5 |
| 23 | 6 | 6 | 6 | 5 |
| 24 | 7 | 6 | 6 | 5 |
| 25 | 7 | 6 | 6 | 6 |
| 26 | 7 | 6 | 7 | 6 |
| 27 | 7 | 7 | 7 | 6 |
| 28 | 8 | 7 | 7 | 6 |
| 29 | 8 | 7 | 7 | 7 |
| 30 | 8 | 7 | 8 | 7 |
| 31 | 8 | 8 | 8 | 7 |
| 32 | 9 | 8 | 8 | 7 |
| 33 | 9 | 8 | 8 | 8 |
| 34 | 9 | 8 | 9 | 8 |
| 35 | 9 | 9 | 9 | 8 |
| 36 | 10 | 9 | 9 | 8 |
| 37 | 10 | 9 | 9 | 9 |
| 38 | 10 | 9 | 10 | 9 |
| 39 | 10 | 10 | 10 | 9 |
| 40 | 11 | 10 | 10 | 9 |
| 41 | 11 | 10 | 10 | 10 |
| 42 | 11 | 10 | 11 | 10 |
| 43 | 11 | 11 | 11 | 10 |
| 44 | 12 | 11 | 11 | 10 |
| 45 | 12 | 11 | 11 | 11 |
| 46 | 12 | 11 | 12 | 11 |
| 47 | 12 | 12 | 12 | 11 |
| 48 | 13 | 12 | 12 | 11 |
| 49 | 13 | 12 | 12 | 12 |
| 50 | 13 | 12 | 13 | 12 |
| 51 | 13 | 13 | 13 | 12 |
| 52 | 14 | 13 | 13 | 12 |
| 53 | 14 | 13 | 13 | 13 |
| 54 | 14 | 13 | 14 | 13 |
| 55 | 14 | 14 | 14 | 13 |
| 56 | 15 | 14 | 14 | 13 |
| 57 | 15 | 14 | 14 | 14 |
| 58 | 15 | 14 | 15 | 14 |
| 59 | 15 | 15 | 15 | 14 |
| 60 | 16 | 15 | 15 | 14 |
| 61 | 16 | 15 | 15 | 15 |
| 62 | 16 | 15 | 16 | 15 |
| 63 | 16 | 16 | 16 | 15 |
| 64 | 17 | 16 | 16 | 15 |

Figure 12b

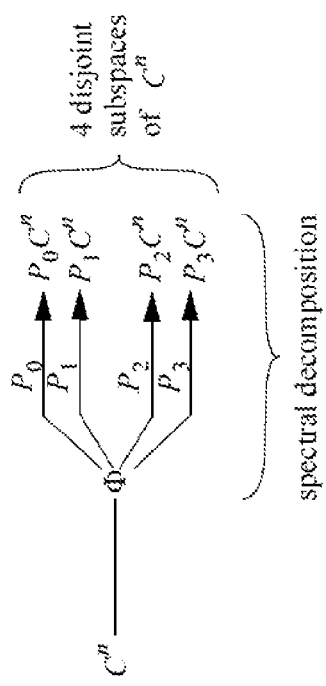
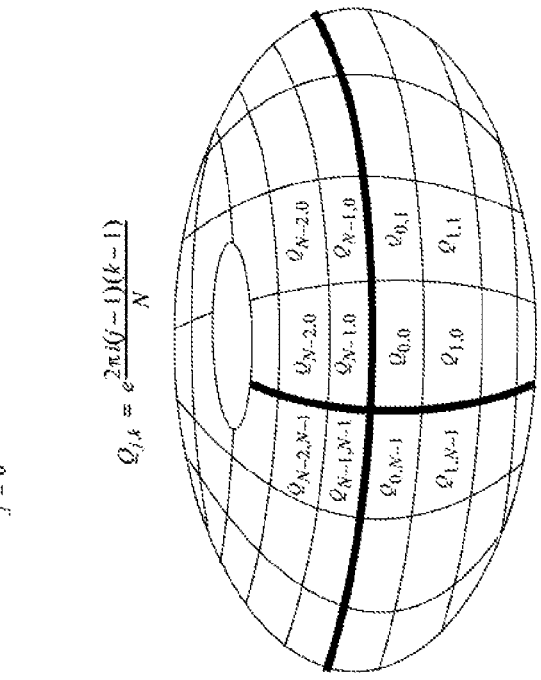
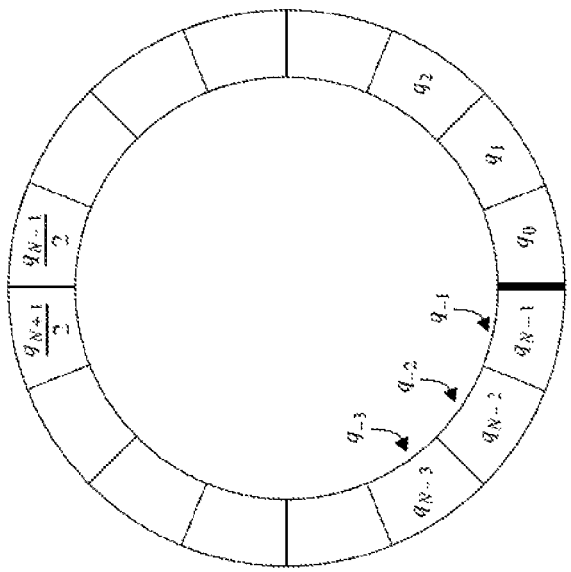
Figure 13a
Figure 13b
Figure 13c
Figure 13d
Figure 13e
Figure 14
Figure 15

$$\frac{1}{\sqrt{L}}\begin{bmatrix} e^{2\pi i\left(\frac{L-1}{2}\right)^2/L} & \cdots & e^{4\pi i\left(\frac{L-1}{2}\right)/L} & e^{2\pi i\left(\frac{L-1}{2}\right)/L} & 1 & e^{-2\pi i\left(\frac{L-1}{2}\right)/L} & e^{-4\pi i\left(\frac{L-1}{2}\right)/L} & \cdots & e^{-2\pi i\left(\frac{L-1}{2}\right)^2/L} \\ \vdots & \ddots & \vdots & \vdots & \vdots & \vdots & \vdots & \ddots & \vdots \\ e^{4\pi i\left(\frac{L-1}{2}\right)/L} & \cdots & e^{8\pi i/L} & e^{4\pi i/L} & 1 & e^{-4\pi i/L} & e^{-8\pi i/L} & \cdots & e^{-4\pi i\left(\frac{L-1}{2}\right)/L} \\ e^{2\pi i\left(\frac{L-1}{2}\right)/L} & \cdots & e^{4\pi i/L} & e^{2\pi i/L} & 1 & e^{-2\pi i/L} & e^{-4\pi i/L} & \cdots & e^{-2\pi i\left(\frac{L-1}{2}\right)/L} \\ 1 & \cdots & 1 & 1 & 1 & 1 & 1 & \cdots & 1 \\ e^{-2\pi i\left(\frac{L-1}{2}\right)/L} & \cdots & e^{-4\pi i/L} & e^{-2\pi i/L} & 1 & e^{2\pi i/L} & e^{4\pi i/L} & \cdots & e^{2\pi i\left(\frac{L-1}{2}\right)/L} \\ e^{-4\pi i\left(\frac{L-1}{2}\right)/L} & \cdots & e^{-8\pi i/L} & e^{-4\pi i/L} & 1 & e^{4\pi i/L} & e^{8\pi i/L} & \cdots & e^{4\pi i\left(\frac{L-1}{2}\right)/L} \\ \vdots & \ddots & \vdots & \vdots & \vdots & \vdots & \vdots & \ddots & \vdots \\ e^{-2\pi i\left(\frac{L-1}{2}\right)^2/L} & \cdots & e^{-4\pi i\left(\frac{L-1}{2}\right)/L} & e^{-2\pi i\left(\frac{L-1}{2}\right)/L} & 1 & e^{2\pi i\left(\frac{L-1}{2}\right)/L} & e^{4\pi i\left(\frac{L-1}{2}\right)/L} & \cdots & e^{2\pi i\left(\frac{L-1}{2}\right)^2/L} \end{bmatrix}$$

Figure 16

$$P^{-1} \propto P$$

In underfocus region: $0 \leq \alpha \leq 2$
In focus plane: $\alpha = 2$
In overfocus region: $\alpha = 2 - iw, w > 2$

HIGH-ACCURACY CENTERED FRACTIONAL FOURIER TRANSFORM MATRIX FOR OPTICAL IMAGING AND OTHER APPLICATIONS

CROSS-REFERENCE TO RELATED APPLICATIONS

This application is a continuation of U.S. Pat. No. 8,542,945 B1, filed Nov. 15, 2010, which claims benefit of priority of U.S. Provisional Application 61/261,358, filed Nov. 15, 2009, the contents of which is incorporated by reference in its entirety.

Further, this application is related to U.S. Pat. Nos. 6,687,418; 7,054,504; 7,203,377; 7,039,252; 7,627,195; 7,697,777, and copending U.S. patent application Ser. Nos. 12/101,878 and 12/754,587, all having the same inventor.

BACKGROUND

1. Field of the Invention

The application relates to the use of operator group properties of the fractional Fourier transform for correction of mis-focus in stored digital images produced by coherent optics such as laser imaging, transmission electron microscope imaging, particle-beam imaging, coherent X-ray imaging, etc. More specifically, the application relates to the creation of centered discrete fractional Fourier transformations with high-accuracy orthonormal eigenvectors for the correction of underfocus and overfocus, and for an automatic control system that automatically improves the focus of a mis-focused image.

2. Background

Although consumer cameras increasingly provide automatic focusing features useful at the time of shooting, in many situations all that exists is an image or video that is out-of-focus and the scene or situation cannot be repeated for the benefit of a new photograph or video to be taken.

The term "blur" is usually reserved for motion blur rather than mis-focus effects, although the term "blur" can include mis-focus effects. However, mis-focus (resulting from mis-adjusted optics, such as a lens mis-setting) fundamentally differs from motion blur (resulting from motion of the subject or the camera).

Motion blur is relatively easily corrected with numerous textbook algorithms [4,5] and several available current products. Numerous techniques have been developed for the correction of motion blur. However, mis-focus effects are fundamentally different from motion blur. Statistically-based processes useful for motion blur can be applied the effects of mis-focus, and can in some cases offer marginal improvement, but a corrected focus is outside the reach of such algorithms. Typically attempts to correct mis-focus with blur correction or any other known techniques almost without fail give very poor results. Aside from the body of work to which this patent application pertains, there are no known mis-focus correction algorithms, Thus if one has a photograph or video of an irreproducible situation that is out-of-focus, there has been simply no recourse.

Image mis-focus is not restricted to conventional optical systems such as photography, video, and optical microscopes. Image mis-focus also occurs with laser systems, electron microscope imaging, particle-beam imaging, coherent X-ray imaging, etc. This second collection of applications employs coherent electromagnetic radiation. In contrast, conventional optical systems such as film and digital photography, video cameras, and optical microscopes employ normal light ("incoherent electromagnetic radiation").

This application may addresses the need for correcting mis-focus in existing images created by "coherent electromagnetic radiation" imaging. The technique includes use of a mathematical transformation known as a fractional Fourier transform [1-3]. The implementations of this application uses algorithms executing on a processor to numerically correct underfocus and/or overfocus conditions in images or portions of images created with coherent light (laser), coherent electron beams (transmission electron microscopes), and potentially those of coherent microwaves (masers), coherent X-ray imaging, and other coherent imaging systems.

In an example realization, the application corrects mis-focus of at least a portion of an image created from coherent imaging in an image file on a numerical processor using a two-dimensional centered fractional Fourier transform or mathematical equivalents. A received image is presented to a numerical processor, and a first numerical value for a variable $\alpha$ is selected and used in an iterative algorithm executing on the numerical processor. A two-dimensional centered discrete fractional Fourier transform operator of power $\alpha$ and a phase correction operator associated with a two-dimensional centered discrete fractional Fourier transform matrix of power $2-\alpha$ are both applied to the at least a portion of the image file to produce a modified at least a portion of the image file which is inspected. A change in the mis-focused condition with respect to the original mis-focused condition is determined and used in adjusting the numerical value for the variable $\alpha$ to a new value for use in a next iteration of the numerical procedure. If real values for $\alpha$ between 0 and a real number $\beta$ do not result in a desired outcome, $\alpha$ is adjusted to a complex value of the form $\beta+\chi$ where $\chi$ is an imaginary number.

SUMMARY

A method for correcting mis-focus of image file created from coherent imaging using centered fractional Fourier transforms or mathematical equivalents is described. A received image is presented to a numerical processor, and a first numerical value for a variable $\alpha$ is selected and used in an iterative numerical procedure, algorithm, system architecture, etc. A centered discrete fractional Fourier transform of power $\alpha$ and a phase restore operator associated with a centered discrete fractional Fourier transform of power $\alpha$ are applied to the image file to produce a modified image. A change in mis-focused is determined and used in adjusting $\alpha$ for a next iteration. If values for $\alpha$ between 0 and real number $\beta$ do not result in a desired outcome, $\alpha$ is adjusted as a complex value $\beta+i\chi$ where $\chi$ is an real number.

Various aspects of the application include: the two-dimensional centered discrete fractional Fourier transform operator of power $\alpha$ is applied either before or after applying the phase correction operator associated with a two-dimensional centered discrete fractional Fourier transform matrix of power $\beta-\alpha$; the two-dimensional centered discrete fractional Fourier transform operator is defined so that the number $\eta$ is 0; the two-dimensional centered discrete fractional Fourier transform operator is defined so that number $\beta$ is 2.

In another aspect of the application, the two-dimensional centered discrete fractional Fourier transform operator or the phase correction operator is represented as a 4-dimensional tensor or a 4-dimensional array.

In another aspect of the application, the two-dimensional centered discrete fractional Fourier transform operator is applied as a first one-dimensional centered discrete fractional Fourier transform matrix operating on columns of the image file and a second one-dimensional centered discrete fractional Fourier transform matrix operating on rows of the at least portions of the image file.

In another aspect of the application, the phase correction is applied as a first one-dimensional phase correction operator matrix associated with a two-dimensional centered discrete fractional Fourier transform matrix of power β-α operating on columns of the at least portions of the image file and a second one-dimensional phase correction operator matrix associated with a two-dimensional centered discrete fractional Fourier transform matrix of power β-α operating on rows of the at least portions of the image file.

The focus correction can be used on images created from coherent imaging, coherent light imaging, or coherent particle beam imaging.

BRIEF DESCRIPTION OF THE DRAWINGS

The above and other aspects, features, and advantages of the present application will become more apparent upon consideration of the following description of preferred embodiments, taken in conjunction with the accompanying drawing figures.

FIG. 12a provides a table of example values of eigenvalue multiplicities of a discrete Fourier transform (DFT) matrix defined with negative exponential argument for example values of n.

FIG. 12b provides a table of example values of eigenvalue multiplicities of a discrete Fourier transform (DFT) matrix defined with positive exponential argument for example values of n.

FIGS. 13a-13e depict representations of an eigenspace spectral decomposition of an n-dimensional DFT matrix.

FIG. 14 depicts the "Fourier ring" representing the periodicity of the 1-dimensional DFT.

FIG. 15 depicts the "Fourier torus" representing the two-fold periodicity of the 2-dimensional DFT.

FIG. 16 depicts an example of the structure of a centered DFT matrix of odd-order.

DETAILED DESCRIPTION OF THE PREFERRED EMBODIMENTS

In the following detailed description, reference is made to the accompanying drawing figures which form a part hereof, and which show by way of illustration specific embodiments of the application. It is to be understood by those of ordinary skill in this technological field that other embodiments can be utilized, and structural, electrical, as well as procedural changes can be made without departing from the scope of the present application. Wherever possible, the same reference numbers will be used throughout the drawings to refer to the same or similar parts.

1. Integral Representation of Lens Imaging

Figure 1:
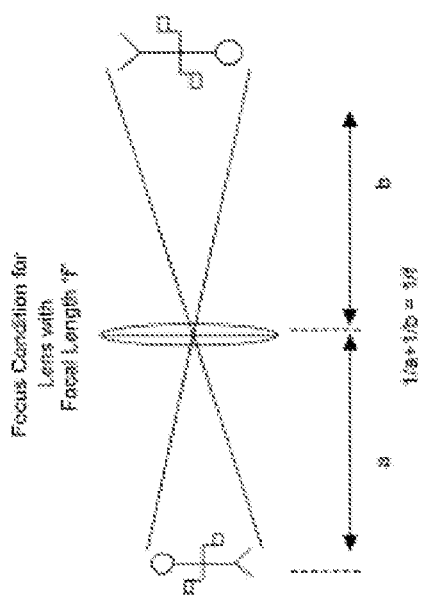
FIG. 1 depicts an exemplary geometric optics setup for the lens law in the case of a convex-convex thin-lens with focal length "f."

FIG. 1 depicts the standard geometric optics setup for the lens law in the case of a convex-convex thin-lens with focal length "f." The incident image is separated by a distance of "a" from the idealized thin-lens.

Figure 2:
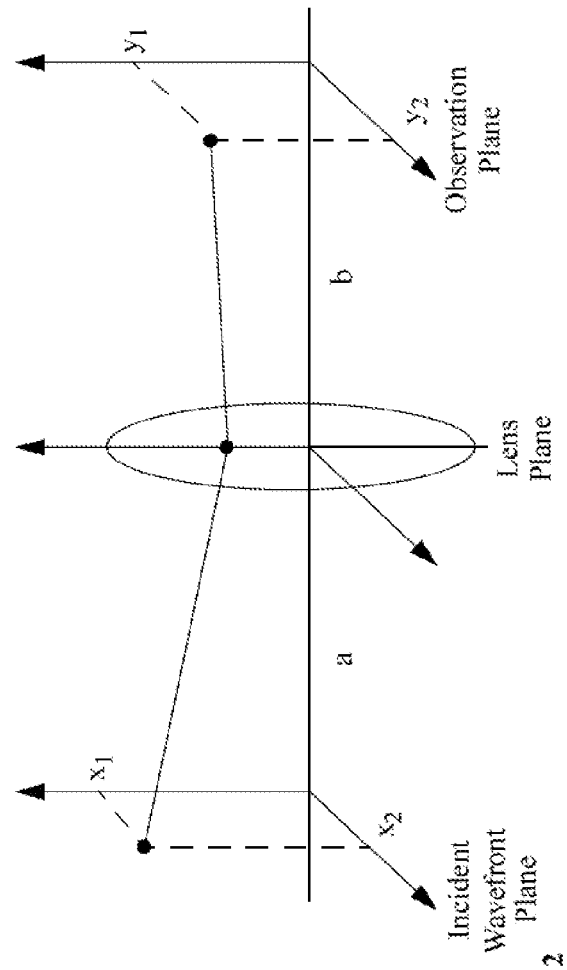
FIG. 2 depicts a setup and notation for mathematical modeling of an exemplary geometric optics setup such as that depicted in Figure A (FIG. 1).

FIG. 2 depicts a setup and notation for mathematical modeling of an exemplary geometric optics setup such as that depicted in FIG. 1. Using the setup and notation of FIG. 2, the general ray-tracing calculation in the case of coherent light (i.e., from a laser) of wavelength λ is well-known [6-8] and can be written as $$L_{(a,b;f)}[u(x_1, x_2)](y_1, y_2) =$$

$$\frac{i\lambda C}{c} e^{\frac{2\pi i(a+b+c/2)}{\lambda}} \int_{-\infty}^{\infty}\int_{-\infty}^{\infty} e^{\left[\frac{2\pi i(ca-1)}{2ca^2\lambda}(x_1^2+x_2^2)\right]} e^{\left[\frac{2\pi i(cb-1)}{2cb^2\lambda}(y_1^2+y_2^2)\right]}$$

$$e^{\left[\frac{-2\pi i}{\lambda abc}(x_1 y_1 + x_2 y_2)\right]} u(x_1, x_2) dx_1 dx_2$$

where $$c = \frac{1}{a} + \frac{1}{b} - \frac{1}{f}$$

and the other constant C can be readily calculated from physical quantities. As with photons, high energy electrons behave as waves, can be focused with various types of "electron lens" technologies, and ideally effectively act as coherent radiation obeying an identical type of ray-tracing calculation [9-10]. Similar extrapolations can be made for other types of well-known and less-well-known coherent radiation such as maser output (producing coherent microwave radiation), other types of high energy particle beam (ion beam, molecular beam, etc.) sources, with potential applications to diffraction imaging, and coherent X-rays.

In any of these, as the quantity $$\frac{1}{a} + \frac{1}{b} - \frac{1}{f}$$

approaches zero, the integral kernel can be shown to converge to the product of two delta functions that invert the signs of the image indices, rendering a full-integrity replica image which, within a scale factor, is upside-down and backwards. The zero-value limit can be calculated in various ways, including mimicking the convergence in a proof of the Fourier transform inverse with a change of variables and accounting for convergence of the double integral in either an $L^2$ or Schwartz-space on $R^2$.

Figure 3:
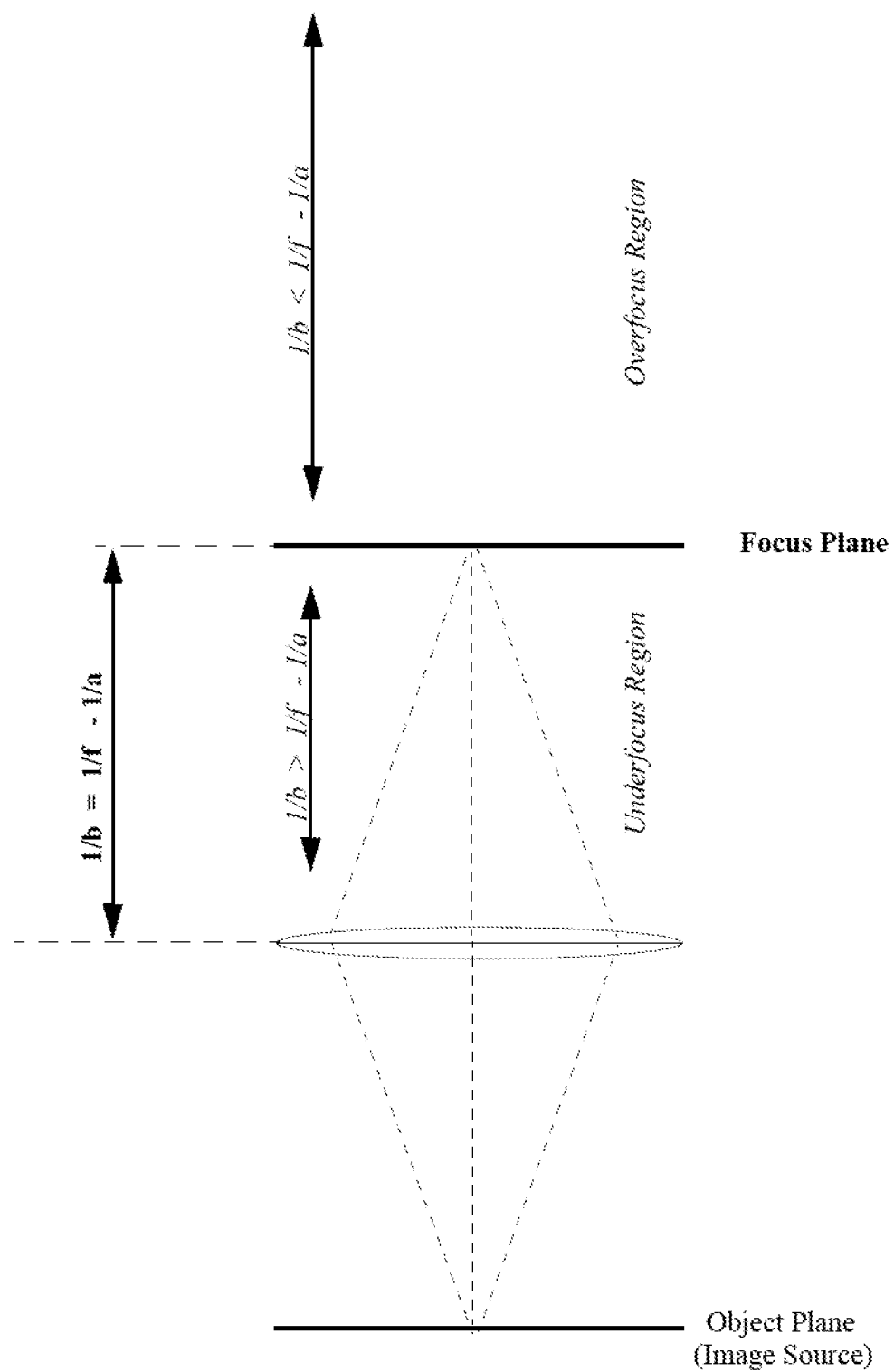
FIG. 3 depicts a point source of light radiating in an expanding spherical wavefront incident on an optical element, the optical element redirecting the radiating light in a convergent spherical wave that converges to a point in the "focus plane," not yet converged in the "underfocus region," and divergent again in the "overfocus region."

FIG. 3 depicts a point source of light radiating in an expanding spherical wavefront incident on an optical element, the optical element redirecting the radiating light in a convergent spherical wave that converges to a point in the "focus plane," not yet converged in the "underfocus region," and divergent again in the "overfocus region:"

- $1/b > (1/f - 1/a)$, that is $b < 1/(1/f - 1/a)$, are underfocus situations,
- $1/b = (1/f - 1/a)$, that is $b = 1/(1/f - 1/a)$, is the focus situation (obeying the lens law), and
- $1/b < (1/f - 1/a)$, that is $b > 1/(1/f - 1/a)$, are overfocus situations.

Figure 4:
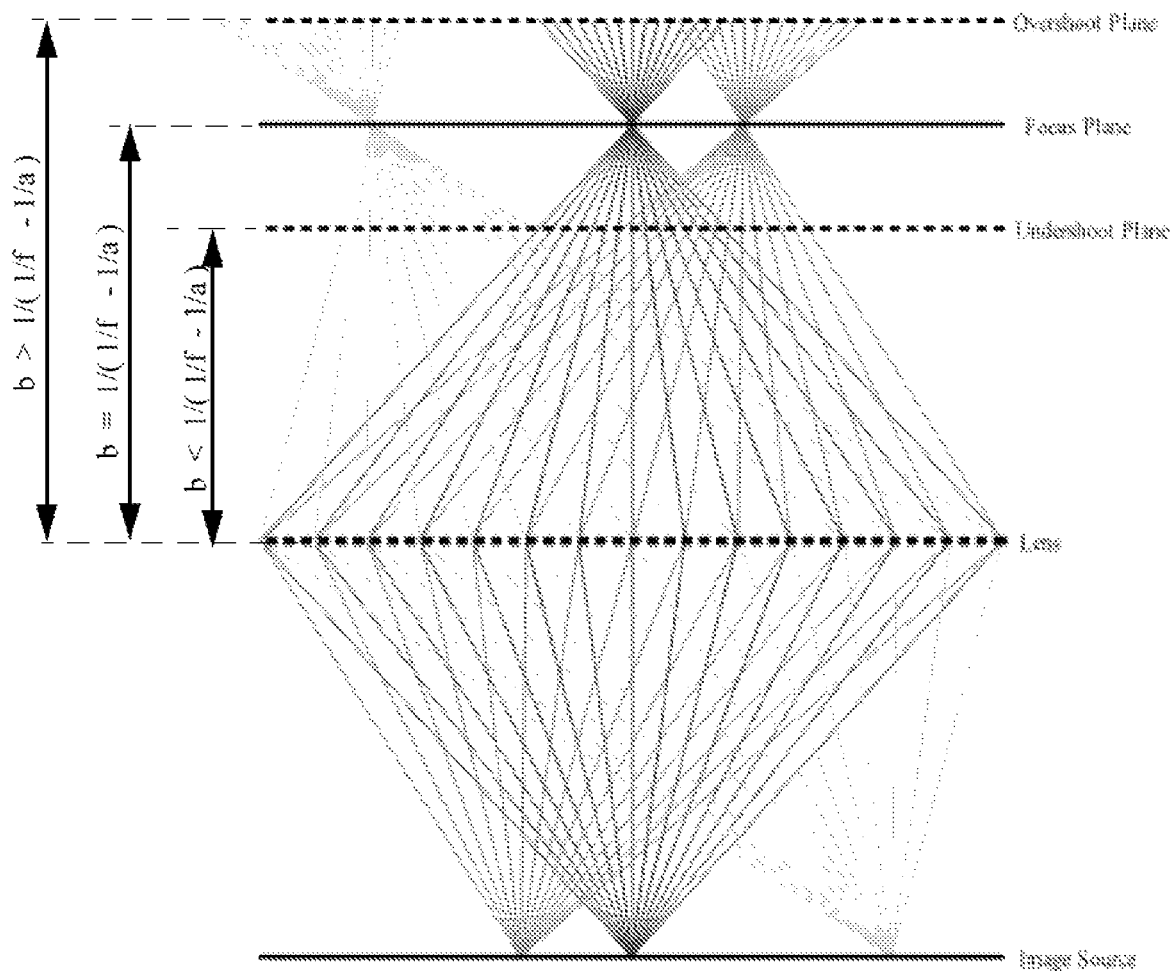
FIG. 4 depicts an adaptation of FIG. 3 comprising three point sources with additional exemplary light rays or particle beam rays so as to show the differences between exemplary underfocus and overfocus processes.

FIG. 4 depicts an adaptation of FIG. 3 comprising three point sources with additional exemplary light rays or particle beam rays so as to show the differences between exemplary underfocus and overfocus processes. Careful inspection of FIG. 4 reveals that the geometry of rays in the modeled region (which includes all underfocus planes) differs from that in the region past the focus plane (which includes all overfocus planes).

As taught in [3] and discussed further below, terms in the above expression can be identified with the 2-dimensional fractional Fourier transform.

2. Fractional Fourier Transform

Contemporary history of the fractional Fourier transform and its role in optics from the viewpoint of this patent application include the treatments and remarks in [1-3]. The inventor's 1988 paper [3], albeit rarely cited anywhere and hardly known, is in fact formally credited as first to connect with lens imaging [2, p. 386]. The calculations in [1] and [3] employed the Mehler kernel [11]. In [3] the use of the Mehler kernel and Hermite functions as an integral representation analog to powers of an infinite-dimensional diagonalizable matrix was suggested to the inventor by C. Robin Graham; this was done independently from and without knowledge of [1] or the large arc of the fractional Fourier transform's broader history [12-20], and indeed some five years prior to the fractional Fourier transform academic publication "wavefront" that began in 1993 which gave rise to the year 2001 book containing [2]. Further fractional Fourier transform history details are richly offered in [2] p. 183-185, albeit not entirely comprehensive as it does not include use of the operator in white noise calculus, imaginary power cases of the Hermite semigroup [21], Brownian motion functionals, and a number of other related transforms, operators, and calculations. Imaginary power cases of the Hermite semigroup (related to the Oscillator Semigroup cited in [2]) will turn out to be relevant to the application, as will be seen shortly.

An integral representation of the 1-dimensional fractional Fourier transform (as used in [3]) is $$F^\alpha[u(x)](y) = \sqrt{\frac{e^{-i\pi\alpha/2}}{\sin(\pi\alpha/2)}} \int_{-\infty}^{\infty} u(x) e^{2\pi i \left[\frac{1}{2}(x^2+y^2)\cot(\frac{\pi\alpha}{2}) - xy\csc(\frac{\pi\alpha}{2})\right]} dx$$

which has period 4, acting as

- the identity operator for $\alpha=0$ (and more generally for $\alpha$ mod 4=0),
- the Fourier transform for $\alpha=1$ (and more generally for $\alpha$ mod 4=1),
- the reflection operator (changing the sign of the function argument from positive to negative) for $\alpha=2$ (and more generally for $\alpha$ mod 4=2),
- the inverse Fourier transform operator for $\alpha=3$ (and more generally for $\alpha$ mod 4=3).

A number of other 1-dimensional fractional Fourier transform integral representation definitions exist; for example in [21] and [22] where the 1-dimensional fractional Fourier transform integral representation has period $2\pi$ rather than period 4.

Figure 5:
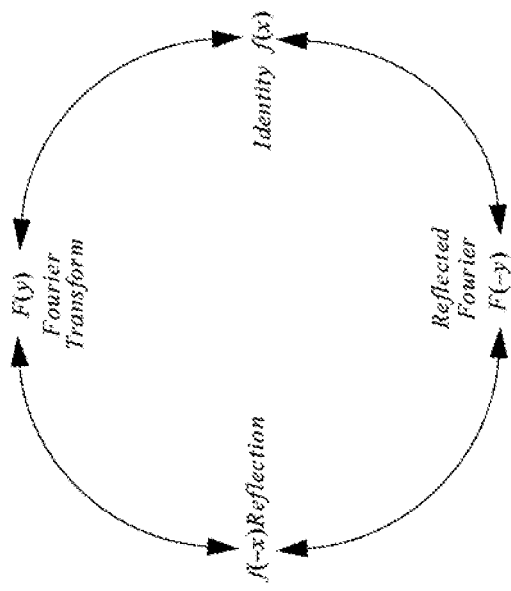
FIG. 5 depicts the fractional Fourier transform for all real-values of the power α is a one-parameter unitary operator group of period 4 that is isomorphic to the circle group.

The fractional Fourier transform for all real-values of the power $\alpha$ is a one-parameter (unitary) operator group, in fact a commutative periodic group (of period 4 as represented and defined above) of unitary operators and isomorphic to the circle group as shown in FIG. 5. Although the fractional Fourier transform power $\alpha$ is usually taken to be real-valued, simply grinding through the algebra and trigonometry for the composition of $F^\alpha$ and $F^\beta$ to prove $F^\alpha F^\beta = F^{\alpha+\beta}$, with an appreciation of Euler' formula and the relations between circular trigonometric functions and hyperbolic trigonometric functions of real, imaginary, and complex arguments show that the fractional Fourier transform, within convergence restrictions, is in fact a one-parameter operator "field" in the sense that, within convergence restrictions, $F^\alpha F^\beta = F^{\alpha+\beta}$ for $\alpha$ and $\beta$ any real, imaginary, or complex number. Although not regarded in this manner, nor in the manner to be employed by the application, fractional Fourier transforms of complex order are considered in [22-26].

Although many signals are 1-dimensional and are compatible with the 1-dimensional Fourier and 1-dimensional Fourier transforms, images are 2-dimensional. For traditional image analysis and optics, a 2-dimensional Fourier transform is used. In Cartesian coordinates, the 2-dimensional Fourier transform can be constructed, using separability properties or assumptions, as a combination of two 1-dimensional Fourier transforms. Accordingly, the 2-dimensional fractional Fourier transform in Cartesian coordinates can be given by $$F^\alpha[u(x_1,x_2)](y_1,y_2) = \frac{e^{-i\pi\alpha/2}}{\sin(\pi\alpha/2)}$$

$$\int_{-\infty}^{\infty}\int_{-\infty}^{\infty} u(x_1,x_2) e^{2\pi i \left[\frac{1}{2}(x_1^2+x_2^2+y_1^2+y_2^2)\cot(\frac{\pi\alpha}{2}) - (x_1 y_1 + x_2 y_2)\csc(\frac{\pi\alpha}{2})\right]} dx_1\, dx_2$$

can be constructed (using separability properties or assumptions) from the 1-dimensional fractional Fourier transform above. In polar coordinates, the Hankel and fractional Hankel transforms provide alternate representations for 2-dimensional fractional Fourier transform. Additionally, identifications of the fractional Fourier transform that can be made with the Wigner transform have led to the fractional Fourier transform being considered as merely a special case of the Wigner transform, particularly in view of the Wigner transform's recent centerpiece role (alongside wavelet theory) in time-frequency analysis and optical image processing.

3. Relating Lens Imaging Integral with Fractional Fourier Transform

As shown in [3], terms in the equation can be identified with the 2-dimensional fractional Fourier transform given above. Via simple term identification, algebra, and trigonometry that the power of the fractional Fourier transform could be related to (referencing FIG. 2) lens focal length f and separations distances a and b by expressions such as $$\alpha = \frac{2}{\pi}\arccos\left[\operatorname{sgn}(f-a)\frac{\sqrt{(f-a)(f-b)}}{f}\right]$$

or various variations of this, for example $$\alpha = \frac{2}{\pi}\arccos\left(\frac{\sqrt{f-a}\sqrt{f-b}}{f}\right)$$

as found in [22].
For the lens law case, namely $$\frac{1}{a} + \frac{1}{b} = \frac{1}{f}$$

the 2-dimensional fractional Fourier transform has power $\alpha$ that calculates to be 2, giving (by way of reflection operators in each dimension) the expected upside-down backwards image (as depicted in FIG. 1). When a=b=f, $\alpha$ calculates to be 1, giving the classical case of Fourier optics. As shown in [3], these identifications can also be used to identify image size scaling factors for the focused and non-focused image, and ratio of these provide the exact magnification factors given in classical ray-tracing optics.

4. Focus Plane, Underfocus Region, and Overfocus Region

Because $\alpha$ is a $2/\pi$ multiple of an arccosine function, in order for $\alpha$ to take on values between −2 and 2 the arccosine function argument, i.e., quantities such as $$\left[\frac{\sqrt{(f-a)(f-b)}}{f}\right] \text{ or } \left(\frac{\sqrt{f-a}\sqrt{f-b}}{f}\right),$$

are restricted to take on only real-number values between −1 and 1, i.e., restricted to take on only the trigonometric range of the arccosine function. However, the term identification process described above (and in more detail in [3]), together with the operator "field" property, implies that the fractional Fourier transform representation should model the behavior in general placements than the focused situation of FIG. 1 in the region between the optical element/lens plane. To do this, the application provides for the fractional Fourier transform to take on complex-valued powers as will be explained.

Consider, as an example, an "in focus" case obeying the lens law.

$$\frac{1}{a} + \frac{1}{b} = \frac{1}{f}$$

where $\alpha$=b=2f. If the observation distance b is reduced slightly, then the arccosine function argument quantities such as $$\left[\frac{\sqrt{(f-a)(f-b)}}{f}\right] \text{ or } \left(\frac{\sqrt{f-a}\sqrt{f-b}}{f}\right)$$

are reduced slightly in magnitude and as such are still real-number values between −1 and 1. If observation distance b is increased slightly, then the arccosine function argument quantities such as $$\left[\frac{\sqrt{(f-a)(f-b)}}{f}\right] \text{ or } \left(\frac{\sqrt{f-a}\sqrt{f-b}}{f}\right)$$

exceed real-number values between −1 and 1. The mathematical implications will be considered shortly, but first these cases will be considered in geometric context via FIG. 3 and FIG. 4.

As described above, FIG. 3 depicts a point source of light radiating in an expanding spherical wavefront incident on an optical element, the optical element redirecting the radiating light in a convergent spherical wave that converges to a point in the "focus plane," not yet converged in the "underfocus region," and divergent again in the "overfocus region." FIG. 4 depicts an adaptation of FIG. 3 comprising three point sources with additional exemplary light rays so as to show the differences between exemplary underfocus and overfocus processes. Careful inspection of FIG. 4 reveals that the geometry of rays in the modeled region (which includes all underfocus planes) differs from that in the region past the focus plane (which includes all overfocus planes). For the example considered above:

b<2 are underfocus situations,
b=2 is the focus situation (obeying the lens law), and
b>2 are overfocus situations.

Figure 6:
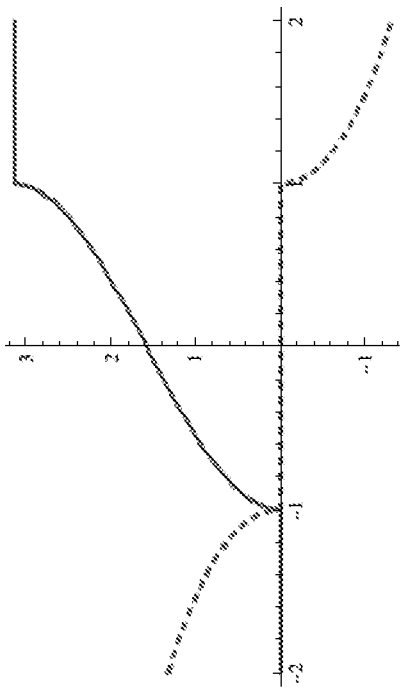
FIG. 6 shows the behavior of the unique analytical continuation of the arccosine function for arguments taking on values between −2 and +2.

Returning now to the mathematical implications, for overfocus situations the argument of arccos exceeds magnitude 1. This forces arccos to take on complex values. FIG. 6 shows an example of the extended-domain behavior of arccosine for arguments, in particular taking on values between −2 and +2, the solid line representing the real part of the arccosine function and the dashed line representing the imaginary part. The extended-domain behavior is both quite elegant and also quite useful; in particular, when the argument of arccosine exceeds a value of 1, the real part of arccosine takes on a fixed real-value of $\pi$ while the imaginary value takes on a monotonically-decreasing negative value departing from zero with growth resembling that of a logarithm.

Figure 7:
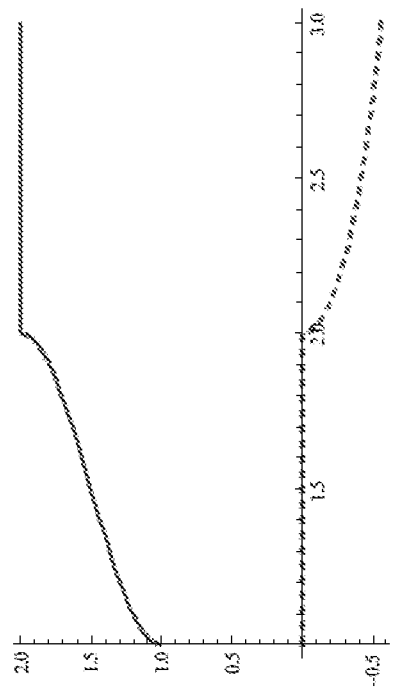
FIG. 7 shows example behavior of the arccosine fractional Fourier power formula, such as in [3], for observation separation distance b taking on values between 1 and 3 in the case of focal length f=1 and source separation distance a=2.

Returning to the a=2f example for varying values of b, FIG. 7 shows example behavior of the arccosine fractional Fourier power formula, such as in [3], for b taking on values between 1 and 3. When b exceeds a value of 2f the real part of the expression for α takes on a fixed real-value of 2 (corresponding to the reflection operator) while the imaginary value takes on a gently monotonically-decreasing negative value departing from zero. If complex-valued α is represented as α=β+iγ where β and γ are real-valued, then $$F^\alpha = F^{\beta+i\gamma} = F^\beta F^{i\gamma}$$

so in the overfocus case $F^\alpha$ behaves like $F^{2+i\gamma}=F^2 F^{i\gamma}$, that is the reflection operator composed with the fractional Fourier transform raised to a purely imaginary power that departing from zero as a gently monotonically-decreasing negative value.

To generalize the behavior of the example, one can set a=A f and b=B f, in which case the lens law becomes $$\frac{1}{Af} + \frac{1}{Bf} = \frac{1}{f}$$

which rationalizes to $$\frac{B}{ABf} + \frac{A}{ABf} = \frac{AB}{ABf}$$

simplifying to the condition B+A=AB, or B+A−AB=0. This is just a restatement of the lens law studied earlier with respect to FIG. 3 and FIG. 4, so in terms of the earlier classifications:

1/B>(1−1/A), that is B<1/(1−1/A), equivalent to B+A−AB<0, are underfocus situations, 1/B=(1−1/A), that is B=1/(1−1/A), equivalent to B+A−AB=0, is the focus situation (obeying the lens law), and 1/B<(1−1/A), that is B>1/(1−1/A), equivalent to B+A−AB>0, are overfocus situations.

Multiplying through by f in each of the conditions above gives:

Bf+Af−ABf<0 are underfocus situations,

Bf+Af−ABf=0 is the focus situation (obeying the lens law), and

Bf+Af−ABf>0 are overfocus situations.

Adding $f^2$ to both sides in each of the conditions above gives:

$f^2$+Bf+Af−ABf<$f^2$ are underfocus situations, $f^2$+Bf+Af−ABf=$f^2$ is the focus situation (obeying the lens law), and $f^2$+Bf+Af−ABf>$f^2$ are overfocus situations.

Factoring and dividing by $f^2$ to both sides in each of the conditions above gives:

(f+8)(f+A)/$f^2$<1 are underfocus situations, (f+8)(f+A)/$f^2$=1 is the focus situation (obeying the lens law), and (f+8)(f+A)/$f^2$>1 are overfocus situations.

Taking the square root of both sides gives conditions where quantities such as $$\left[\frac{\sqrt{(f-a)(f-b)}}{f}\right] \text{ or } \left(\frac{\sqrt{f-a}\sqrt{f-b}}{f}\right)$$

being less than, equal to, or greater than 1 correspond, respectively, to underfocus situations, focus situation (obeying the lens law), and overfocus situations, for example:

$$\left[\frac{\sqrt{(f-a)(f-b)}}{f}\right] < 1 \text{ are underfocus situations,}$$

$$\left[\frac{\sqrt{(f-a)(f-b)}}{f}\right] =$$

1 is the focus situation (obeying the lens law), and $$\left[\frac{\sqrt{(f-a)(f-b)}}{f}\right] > 1 \text{ are overfocus situations.}$$

5. Mis-Focus Correction Theory

The focus correction technology and theory has described in a sequence of issued and pending patents by the inventor, including U.S. Pat. Nos. 6,687,418; 7,054,504; 7,203,377; 7,039,252; 7,627,195; 7,697,777 and pending U.S. patent application Ser. Nos. 12/101,878 and 12/754,587. The approach is briefly reviewed here and then explicitly treated separately for underfocus and overfocus situations.

Figure 8:
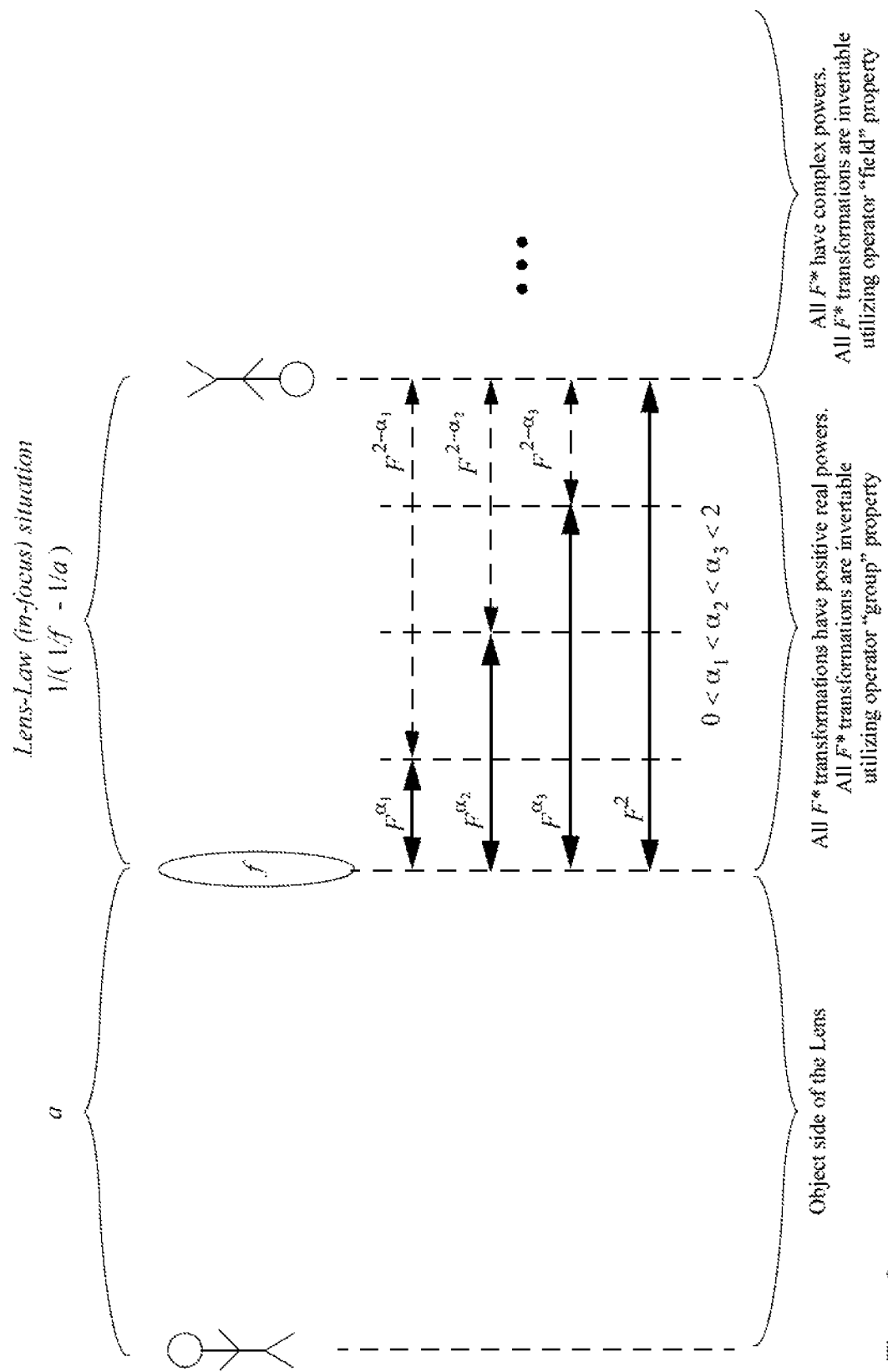
FIG. 8 depicts an adaptation of the arrangement depicted earlier in FIG. 3 and FIG. 4 adapted for discussion of misfocus correction.

FIG. 8 depicts an adaptation of the arrangement depicted earlier in FIG. 3 and FIG. 4 adapted for discussion of mis-focus correction. If the separation distance between the lens and the observation plane is such that the lens law is satisfied, i.e., a separation distance of 1/(1/f−1/a), then the optics behaves as the two-dimensional fractional Fourier transform with power 2, i.e., a reflection operator that reverses the sign of the spatial argument of each image point of both dimensions of the rendered focused image. If the separation distance is less than 1/(1/f−1/a), then the optics is in an underfocus situation and accordingly behaves as the two-dimensional fractional Fourier transform with a real-valued power that is less than 2. In such cases, an additional fractional Fourier operation can be used to correct the optics situation resulting from the difference in the underfocus separation distance and the focus separation distance 1/(1/f−1/a). This follows from the group property of the fractional Fourier transform for real-valued powers:

$$F^{2-\alpha}F^\alpha = F^2.$$

If the image rendered in the underfocus situation is recorded, its phase information is, with all but the most specialized of situations, lost. However, should it be that if the image did not have missing phase information $F^\alpha$—for some unknown value of α—would be proper mis-focus correction, then by the group property the underfocus operation must be $F^{2-\alpha}$. If $F^{2-\alpha}$ can be calculated, then the phase information of $F^{2-\alpha}$ can be extracted and imposed (with proper registration) on the recorded image. Thus an iterative procedure or algorithm can be created to close in and converge to a correction in the underfocused case:

Select a small trial positive real-value of α

Begin a chain of calculations depending upon α:
  Calculate Fα and the phase information of $F^{2-\alpha}$
  Impose the phase information of $F^{2-\alpha}$ on the recorded image and apply Fα
  Determine if the mis-focus has been adequately improved If the mis-focus has not been adequately improved, the procedure is complete If the mis-focus has not been adequately improved, select a slightly more positive trial real-number value of a and perform the chain of calculations again.

Figure 9:
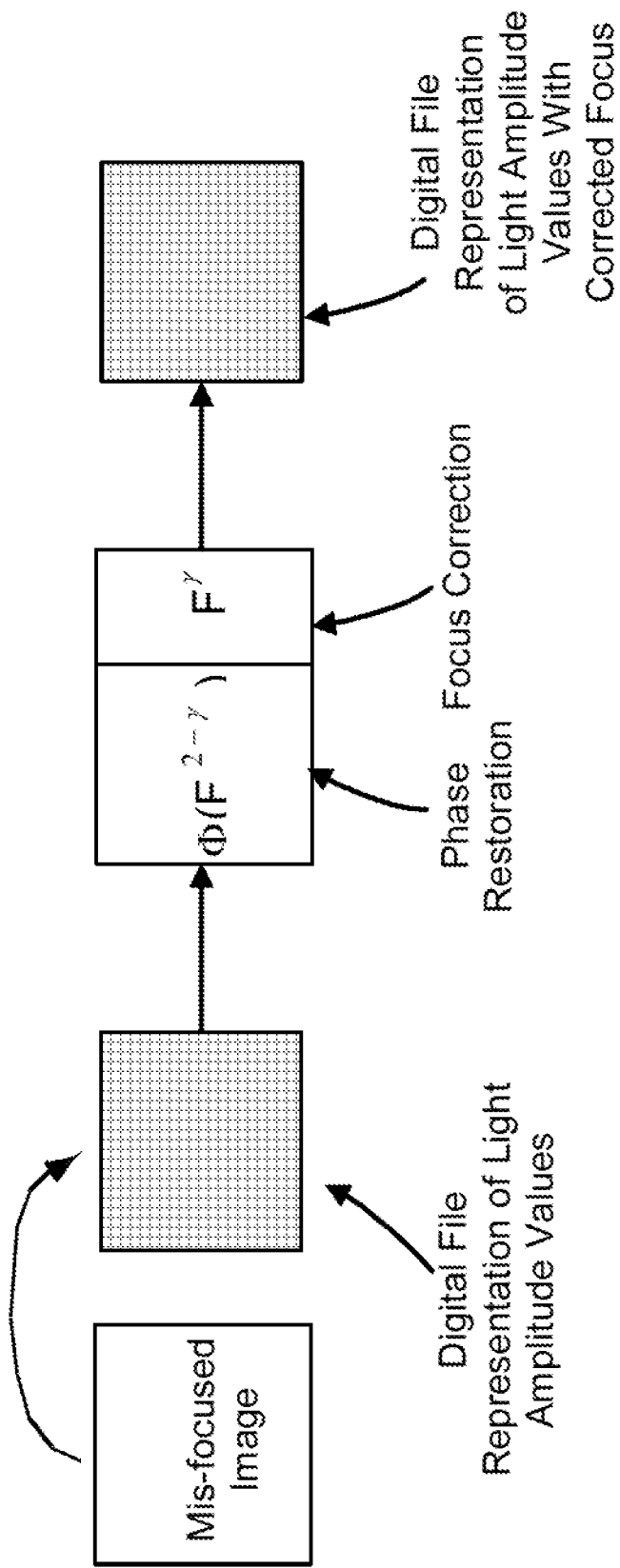
FIG. 9 depicts an exemplary image information flow for a focus correction system.
Figure 10:
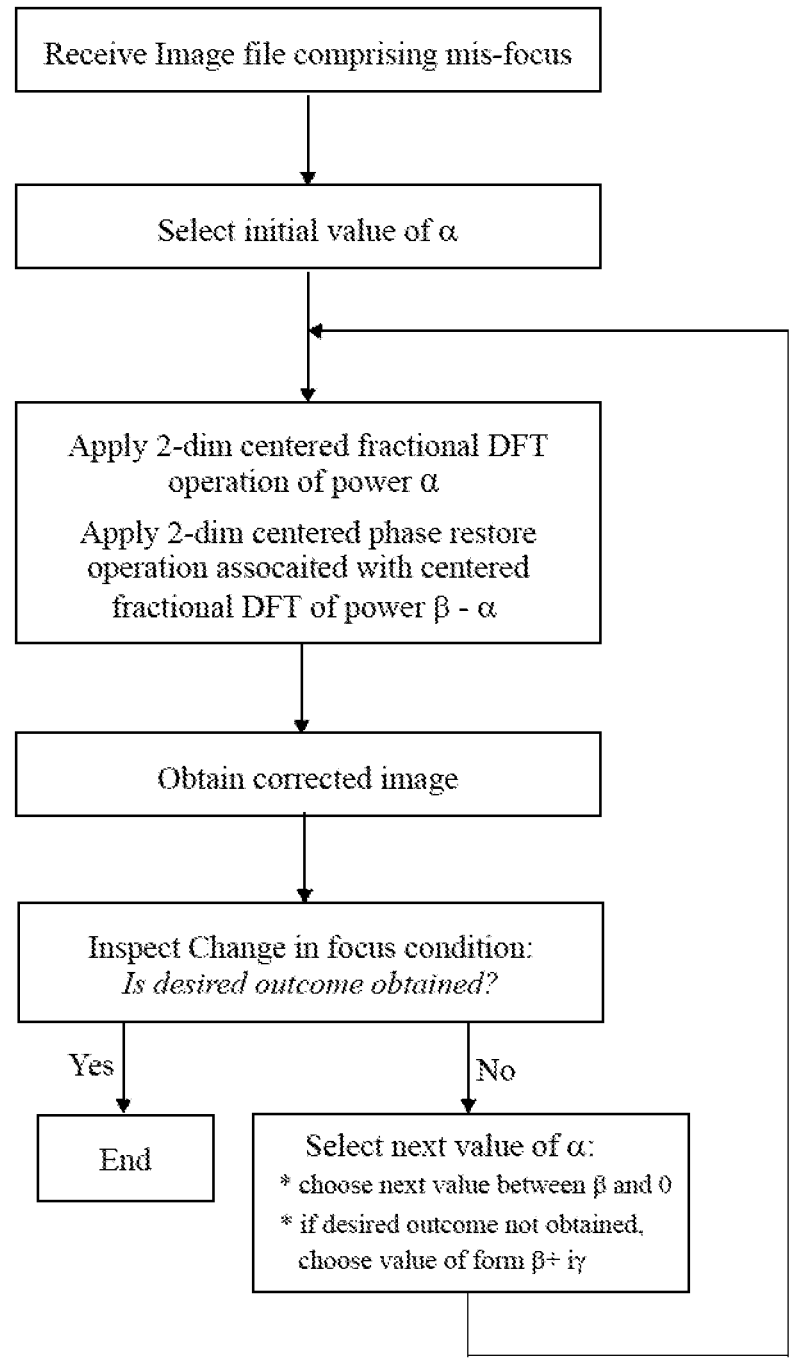
FIG. 10 collectively depicts an exemplary algorithmic structure for a focus correction system.

FIG. 9 and depicts an exemplary image information flow for a focus correction system. FIG. 10 collectively depicts an exemplary algorithmic structure for a focus correction system.

In the case of an overfocused image, the "field" property of the fractional Fourier transform for complex-valued powers (instead of the group property for $\alpha$ real) is used, i.e.

$$F^{2-\alpha}F^{\alpha}=F^2.$$

where $\alpha$ is real, imaginary, or complex. Since the overfocus condition is equivalent to $F^{2+i\gamma}$ for some unknown negative real value of $\gamma$, the corresponding mis-focus correction would $F^{-i\gamma}$ because $$F^{2+i\gamma}F^{-i\gamma}=F^2.$$

Thus an iterative procedure or algorithm can be created to close in and converge to a correction in the overfocused case:
  Select a small trial negative real-value of $\gamma$
  Begin a chain of calculations depending upon $\gamma$:
    Calculate $F^{-i\gamma}$ and the phase information of $F^{2+i\gamma}$
    Impose the phase information of $F^{2+i\gamma}$ on the recorded image and apply $F^{-i\gamma}$
    Determine if the mis-focus has been adequately improved
    If the mis-focus has not been adequately improved, the procedure is complete
    If the mis-focus has not been adequately improved, select a slightly more negative trial negative real-number value of $\square$ and perform the chain of calculations again.

The arrangements of FIG. 9 and FIG. 10 also support the above described overfocus case. The underfocus and overfocus procedures can be combined in various ways. For example, a first one or more iterations for the underfocus case can be tried using small real positive values of a, and then one or more iterations for the overfocus case can be tried using small real negative values of g (equivalent to small imaginary values of a). In one approach, the underfocus trials complete and then the overfocus trials are started. In another approach, underfocus trials and overfocus trials are interleaved.

As a remark, it is interesting to note that the purely imaginary powers of the fractional Fourier transform used to correct the overfocus case convert the circular trigonometric cotangent and cosecant functions in the integral representation of the fractional Fourier transform into hyperbolic cotangent and hyperbolic cosecant functions. The format of the fractional Fourier transform wherein the circular trigonometric cotangent and cosecant functions are respectively replaced with hyperbolic cotangent and hyperbolic cosecant functions is in fact the Hermite Semigroup [21] (which, by virtue of the remarks made earlier, can in fact be treated as an operator group or operator "field;" it is also sometimes associated with the Oscillator Semigroup [21]).

Thus, thanks to the elegant complex-value behavior of the extended-domain arccosine function, the mis-focus correction operation for underfocus is based on the fractional Fourier transform and the mis-focus correction for overfocus is based on the Hermite Semigroup.

6. Numerical Implementation of the Fractional Fourier Transform for Digital Image Processing Thus far the development has been in terms of the integral representation of the continuous fractional Fourier transform. The continuous fractional Fourier transform can be approximated by the discrete fractional Fourier transform, and the fractional Fourier transform can be executed on a numerical processor such as a computer or DSP chip. Accordingly, attention is now directed to developing the 1-dimensional discrete fractional Fourier transform as a matrix operator that can be executed on a numerical processor, expanding it to a 2-dimensional discrete fractional Fourier transform, accommodating the underfocus and overfocus cases, and utilizing these to correct mis-focus in at least a portion of an image file, the image file comprising a representation of an image created by coherent imaging processes.

There are various approaches and definitions and approximations to the notion of a discrete fractional Fourier transform, for example but hardly limited to [27-30]. All the known discrete fractional Fourier transform constructions to the inventor have one or more aspects of concern, loose ends, not well-defined, etc. Although the application provides for the use of any discrete fractional Fourier transform constructed from orthogonal eigenvectors and which has been centered (for example using the row and column barrel-shift centering operations to be described or other methods taught in the patents and patent applications to be mentioned next), the present application provides another construction designed to nicely fit the approaches and needs of the application.

In particular, the discrete fractional Fourier transform and centered discrete fractional Fourier transform have described in a sequence of issued patents and pending patent applications by the inventor, including U.S. Pat. Nos. 6,687,418; 7,054,504; 7,203,377; 7,039,252; 7,627,195; 7,697,777 and pending U.S. patent application Ser. Nos. 12/101,878 and 12/754,587. The concepts are briefly reviewed and additional details pertaining to the present application are provided.

The 1-dimensional discrete Fourier transform ("DFT")

$$X_k = \sum_{n=0}^{N-1} x_n e^{\frac{2\pi i}{N}kn}$$

can be used to approximate the 1-dimensional "continuous" (integral representation integrated over contiguous portions of the real line or complex plane) Fourier transform, but must be used in this way with care (such "care" typically simply band-limiting the applied image to avoid aliasing). The 1-dimensional DFT can be represented as a matrix; in unitary-matrix normalization a representation is:

$$\frac{1}{\sqrt{L}}\begin{bmatrix} 1 & 1 & 1 & \ldots & 1 \\ 1 & e^{2\pi i/L} & e^{4\pi i/L} & \ldots & e^{2\pi i(L-1)/L} \\ 1 & e^{4\pi i/L} & e^{8\pi i/L} & \ldots & e^{4\pi i(L-1)/L} \\ \ldots & \ldots & \ldots & \ldots & \ldots \\ 1 & e^{2\pi i(L-1)/L} & e^{4\pi i(L-1)/L} & \ldots & e^{2\pi i(L-1)^2/L} \end{bmatrix}$$

The theory of DFT matrix eigenvectors is lengthy [31-38] and likely still under development. As with the continuous Fourier transform, the DFT matrix is diagonalizable (no Jordan blocks) despite having, for all DFT matrices of various orders, four eigenvalues of $$\{1,-i,-1,i\}.$$

as shown in [31-38] and [39]. The DFT matrix diagonalization permits a canonical representation $$\text{DFT}=P^{-1}\Lambda P.$$

where P is the matrix of eigenvectors and $\Lambda$ is a diagonal matrix of correspondingly-ordered eigenvalues. Taking integer-valued powers M of the DFT matrix gives the product of M terms $$\text{DFT}^M=(P^{-1}\Lambda P)\ldots(P^{-1}\Lambda P).$$

Since $PP^{-1}=I$, the M−1 ($PP^{-1}$) terms collapse to the Identity matrix, giving $$DFT^M = P^{-1} \wedge^M P$$

where $\wedge^M$ calculates to be a diagonal matrix whose diagonal elements are the $M^{th}$ power of the diagonal elements of $\wedge$. Using the same idea for matrix G having matrix of eigenvectors P but diagonal matrix D $$G = P^{-1}DP,$$

solving for D $$D = PGP^{-1},$$

taking integer-valued powers K of the matrix D gives the product of K terms $$D^K = (PGP^{-1}) \ldots (PGP^{-1}).$$

Since $P^{-1}P = I$, the K−1 ($P^{-1}P$) terms collapse to the Identity matrix, giving $$D^K = PG^K P^{-1}$$

Setting $G^K = DFT^M$ and $D^K = \wedge^M$ gives $$\wedge^M = PDFT^M P^{-1}$$

which implies $G = DFT^{M/K}$ and $D = \wedge^{M/K}$, giving $$DFT^\alpha = P \wedge^\alpha P^{-1}$$

as a representation of rational fractional powers of the DFT matrix. Using continuity properties and analytic continuation, the relation extends to all finite real, imaginary, or complex values of α. This outcome can also be found throughout the literature, for example in [29] page 15.

As suggested earlier, there are also a number of alternate fractional power DFT approaches that have been suggested, for example but hardly limited to [27-30] and [40-42]. Again the application provides for the use of any discrete fractional Fourier transform constructed from orthogonal eigenvectors and which has been centered (the centering to be discussed shortly), but here the discussion continues with another construction designed to nicely fit the approaches and needs of the application.

Figure 11A:
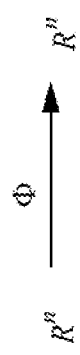
FIGS. 11a-11c depict representations of the range and domain of an n-dimensional DFT matrix.
Figure 11B:
Figure 11C:
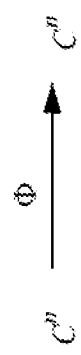

The DFT matrix of order n is an n-by-n matrix that maps a vector in $R^n$ to another vector in either $R^n$ (as suggested in FIG. 11a) or, far more typically, $C^n$ (as suggested in FIG. 11b). Most generally, the DFT matrix of order n is an n-by-n matrix that maps a vector in $C^n$ to another vector in either $C^n$ (as suggested in FIG. 11c). Returning to the four repeating eigenvalues $$\{1, -i, -1, i\}$$

of the DFT matrix, these can be represented as $$\{(-i)^0, (-i)^1, (-i)^2, (-i)^3\}.$$

Each of the four eigenvalues is associated with its own disjoint (except for the origin) subspace of the range of the DFT matrix (for example $C^n$), each subspaces spanned by the set of eigenvectors sharing the associated eigenvalue. Within each of these subspaces, the eigenvalue associated with the subspace is associated for every eigenvector in that subspace.

The multiplicity of the four repeated eigenvalues are well known—for example, in [36] which (see equation 1 therein) defines the DFT with matrix elements whose exponential function arguments are negative imaginary multiples of the variables, and [39] which (see equation 12 therein) defines the DFT with matrix elements whose exponential function arguments are positive imaginary multiples of the variables. For the DFT with matrix elements whose exponential function arguments are negative imaginary multiples of the variables (as in [36]), the multiplicities of the four repeated eigenvalues are given by $$m(+1) = \text{Floor}\left[\frac{n}{4}\right] + 1$$

$$m(-i) = \text{Floor}\left[\frac{n+1}{4}\right]$$

$$m(-1) = \text{Floor}\left[\frac{n+2}{4}\right]$$

$$m(+i) = \text{Floor}\left[\frac{n+3}{4}\right] - 1$$

FIG. 12a provides a table of example values of these multiplicities for example values of DFT order n. For the DFT with matrix elements whose exponential function arguments are positive imaginary multiples of the variables (as in [39]), the multiplicities of the four repeated eigenvalues are given by $$m(1) = \text{Floor}\left[\frac{n}{4}\right] + 1$$

$$m(i) = \text{Floor}\left[\frac{n+1}{4}\right]$$

$$m(-1) = \text{Floor}\left[\frac{n+2}{4}\right]$$

$$m(-i) = \text{Floor}\left[\frac{n+3}{4}\right] - 1$$

FIG. 12b provides a table of example values of these multiplicities for example values of DFT order n.

The traditional DFT, like the continuous Fourier transform, has eigenvectors $\{1, -i, -1, i\}$ which can be represented as $\{(-i)^0, (-i)^1, (-i)^2, (-i)^3\}$. Because of the Hermite function details [11] in the case of the continuous Fourier transform, it is readily possible to represent "i" as $e^{i\pi/2}$ and "−i" as $e^{-i\pi/2}$ so that in a well-defined manner the fractional powers nα of "i" and "−i" can be represented as $e^{in\alpha\pi/2}$ and as $e^{-in\alpha\pi/2}$. However, as seen in the multiplicity tables and in the structuring and orthogonalization of the eigenvectors within subspaces to be described below, the situation is not as clear for the discrete fractional Fourier transform case. For a given eigenvalue equal to $e^{in\alpha\pi/2}$ or $e^{-in\alpha\pi/2}$ for some n=k and *having* multiplicity m, the candidate powers of n are $$n = k,$$

$$n = k + 4,$$

$$\ldots$$

$$n = k + 4(m-1).$$

Although other arrangements can be used, in an implementation the lower values attained by n are associated with the eigenvectors with the fewest fluctuations and zero-crossings from element to element within the eigenvector, continuing monotonically so that higher values attained by n are associated with the eigenvectors with the fewest fluctuations and zero-crossings from element to element within the eigenvector. This is analogous to the natural assignment in the Hermite function case as the Hermite functions of order n experience monotonically increasing fluctuations and zero-crossings as n increases.

The partition of the range of the DFT matrix (for example $C^n$) into separate subspaces, each subspace associated with one of the eigenvalue and spanned by the set of eigenvectors sharing that eigenvalue, is depicted in FIG. 13a and is formally called a spectral decomposition. The mapping from the full range of the DFT matrix to a particular subspace is called a "projector," "projection," "projection operator," or "projector matrix" in various setting according to context and representational settings. For example, if the subspace associated with $(-i)^j$ is denoted as the $j^{th}$ subspace, that subspace has and associated projector $P_j$. As the DFT matrix has repeated eigenvalues represented as $\{(-i)^0, (-i)^1, (-i)^2, (-i)^3\}$, in this approach j takes on values from the set $\{0, 1, 2, 3\}$. The four subspace mappings are represented in FIG. 13a as each of the four projectors $\{P_0, P_1, P_2, P_3\}$ operating on $C^n$.

Each of the four projectors $\{P_0, P_1, P_2, P_3\}$ for the DFT or order n can be represented as an n-by-n matrix. The rank of each such matrix $P_j$ is given by $m((-i)^j)$. In such a representation, the DFT matrix, here represented as $\Phi$, is the sum of these subspaces multiplied by the eigenvalue for the subspace.

$$\Phi = \sum_{j=0}^{3} i^j P_j$$

The spectral decomposition can be represented more abstractly, i.e., not necessarily in the form of an n-by-n matrix, as in the representations shown in FIG. 13a as well as the other representations shown in FIGS. 13b-13e.

Various sums and products of the projector matrices for the DFT matrix have a number of different properties, some of which stem from the fact that for the DFT matrix of order n $(\sqrt{n}\Phi)^n = I$ so that the DFT matrix of order n scaled by the square root of n behaves as an $n^{th}$ root of unity. These can be used, for example as shown in [39], to explicitly calculate closed-form solutions for DFT eigenvectors. This will be used shortly. However, the traditional DFT matrix is not directly suitable for modeling optics effects without some reorganization as discussed below and in the inventor's U.S. Pat. No. 7,039,252 and pending U.S. patent application Ser. No. 12/101,878.

6.1 Centering of the Discrete Fractional Fourier Transform

It is critical when constructing fractional powers of the DFT matrix or other 1-sided constructions neglect the fact that the zero-argument exponential terms are along the edges of the matrix and that these not only do not correspond to the symmetric-centering of the continuous Fourier transform nor (more importantly) to the center-symmetric ray-tracing geometry clearly seen in FIG. 1, FIG. 2, and FIG. 3. Instead, the DFT matrix, or DFT sum, must be shifted and of odd-integer N so as to have centered zero-argument exponential terms. This is treated in the inventor's U.S. Pat. No. 7,039,252 and pending U.S. patent application Ser. No. 12/101,878 but summarized briefly here.

First the centering of a 1-dimensional DFT matrix is considered. The centered DFT matrix can be obtained by performing "barrel roll" operations of a degree determined by the order of the DFT matrix on the rows and columns of a DFT matrix, and it is shown that the same barrel roll operations are inherited into the canonical form of the centered DFT matrix. This permits the creation of closed-form eigenvectors for the centered DFT matrix by performing a barrel roll operation on each of the closed-form eigenvectors of the traditional DFT matrix. This allows for the creation of a centered 1-dimensional fractional Fourier transform matrix. Then, for the processing of images, two centered 1-dimensional fractional Fourier transform matrices, each of which can be of different orders, are structured for combined use on the image—for example, utilizing different sets of array indices (one set of indices for each image dimension), a 4-dimensional tensor representation, separate centered 1-dimensional fractional Fourier transform matrix operations for each image dimension, etc.

For the DFT of order n whose exponential function arguments are negative imaginary multiples of the variables (as in [36]), the DFT invokes the following operation on a n-element vector $\{x_1, \ldots, x_n\}$:

$$X_k = \frac{1}{\sqrt{n}} \sum_{n=0}^{N-1} x_n e^{\frac{2\pi i}{N}(k+b)(n+a)}$$

The corresponding matrix representation is given by $$\Phi = \frac{1}{\sqrt{2}} \begin{bmatrix} 1 & 1 & \ldots & 1 \\ \vdots & \ldots & \vdots & \vdots \\ 1 & \ldots & e^{-2\pi i(j-1)(k-1)} & e^{-2\pi i(j-1)(n-1)} \\ \vdots & \ldots & \vdots & \vdots \\ 1 & \ldots & e^{-2\pi i(n-1)(k-1)} & e^{-2\pi i(n-1)^2} \end{bmatrix}$$

For the DFT of order n whose exponential function arguments are positive imaginary multiples of the variables (as in [39]), the DFT invokes the following operation on a n-element vector $\{x_1, \ldots, x_n\}$:

$$X_k = \frac{1}{\sqrt{n}} \sum_{n=0}^{N-1} x_n e^{\frac{2\pi i}{N}(k+b)(n+a)}$$

The corresponding matrix representation is given by $$\Phi = \frac{1}{\sqrt{n}} \begin{bmatrix} 1 & 1 & \ldots & 1 \\ \vdots & \ldots & \vdots & \vdots \\ 1 & \ldots & e^{2\pi i(j-1)(k-1)} & e^{2\pi i(j-1)(n-1)} \\ \vdots & \ldots & \vdots & \vdots \\ 1 & \ldots & e^{2\pi i(n-1)(k-1)} & e^{2\pi i(n-1)^2} \end{bmatrix}$$

The fact that the DFT sum and DFT matrix, as well as operations using these, can be calculated by a computer as is well known to one skilled in the art.

Within these expressions, the comprised terms $$e^{-\frac{2\pi i}{N}(k+b)(n+a)} \text{ and } e^{\frac{2\pi i}{N}(k+b)(n+a)}$$

are periodic both in row k and column n directions as depicted in FIG. 14 (the "Fourier ring" form of which is adapted from [43]).

Because of periodicity of the terms in the DFT matrix in both the row and column directions, an added right column or added bottom row continuing the DFT matrix term formula of $$DFT_{(L)}(p, q) = \frac{1}{\sqrt{L}} e^{-2\pi i(p-1)(q-1)/L}$$

$$DFT_{(L)}(p, q) = \frac{1}{\sqrt{L}} e^{2\pi i(p-1)(q-1)/L}$$

or
would repeat, respectively, the matrix left column or first row, resulting in the structure of FIG. 15 (the "Fourier torus" form of which is adapted from [43]). The centered DFT matrix of odd-order would be of the form shown in FIG. 16; this comprises various orientation and scaling transformations of the traditional (N+1)/2 DFT matrix:

$$\frac{1}{\sqrt{\frac{(L+1)}{2}}} \begin{bmatrix} 1 & 1 & 1 & \ldots & 1 \\ 1 & e^{2\pi i/L} & e^{4\pi i/L} & \ldots & e^{2\pi i \frac{(L-1)}{2}/L} \\ 1 & e^{4\pi i/L} & e^{8\pi i/L} & \ldots & e^{4\pi i \frac{(L-1)}{2}/L} \\ \ldots & \ldots & \ldots & \ldots & \ldots \\ 1 & e^{2\pi i \frac{(L-1)}{2}/L} & e^{4\pi i \frac{(L-1)}{2}/L} & \ldots & e^{2\pi i \frac{(L-1)^2}{2}/L} \end{bmatrix}$$

Alternatively, a linear algebra method for zero-centering of the DFT and/or of DFT eigenvectors is now presented. This approach also creates machinery useful in proving that row and column barrel-shift operations on the DFT matrix can also be applied to the eigenvector matrix and diagonal eigenvalue matrix of the canonical representation for the DFT matrix, and the subsequently shifted eigenvector matrix and diagonal eigenvalue matrix form the canonical representation for the shifted DFT matrix; this fact is first proved immediately below.

Let H be a square n-by-n diagonalizable non-singular matrix with eigenvectors arranged to form matrix P with correspondingly arranged eigenvalues $$\{\lambda_1, \lambda_2, \ldots \lambda_n\} \text{ and } \Lambda = \begin{bmatrix} \lambda_1 & 0 & 0 & \ldots & 0 \\ 0 & \lambda_2 & 0 & \ldots & 0 \\ 0 & 0 & \lambda_3 & \ldots & 0 \\ \ldots & \ldots & \ldots & \ldots & \ldots \\ 0 & 0 & 0 & \ldots & \lambda_n \end{bmatrix}.$$

Then H can be represented as H=PΛP$^{-1}$.

Let S be a (forward or reverse) shift matrix (that is, a row or a column permutation of n-by-n identity matrix). Let G be the matrix with rows and columns shifted by S: G=SHS$^{-1}$ $$G = SHS^{-1}$$
$$= S(P\Lambda P^{-1})S^{-1}$$
$$SP I \Lambda IP^{-1}S^{-1} \text{(since } I = SS^{-1}\text{)}$$
$$= SP(S^{-1}S)\Lambda(S^{-1}S)P^{-1}S^{-1}$$
$$(SPS^{-1})(S\Lambda S^{-1})(SP^{-1}S^{-1})$$

$$(SPS^{-1})^{-1} = SP^{-1}S^{-1}$$

Since $(AB)^{-1} = B^{-1}A^{-1}$ (Proof: $(AB)^{-1}AB = B^{-1}A^{-1}AB = B^{-1}IB = B^{-1}B = I$)

Therefore the shifted matrix G, i.e., the shifted version of the matrix H, has a canonical form comprising a shifted version (SP) of the P matrix (the matrix of eigenvectors of matrix H) and correspondingly shifted version (SΛ) of Λ (the diagonal matrix of associated eigenvalues of matrix H).

Figures 17, 18:
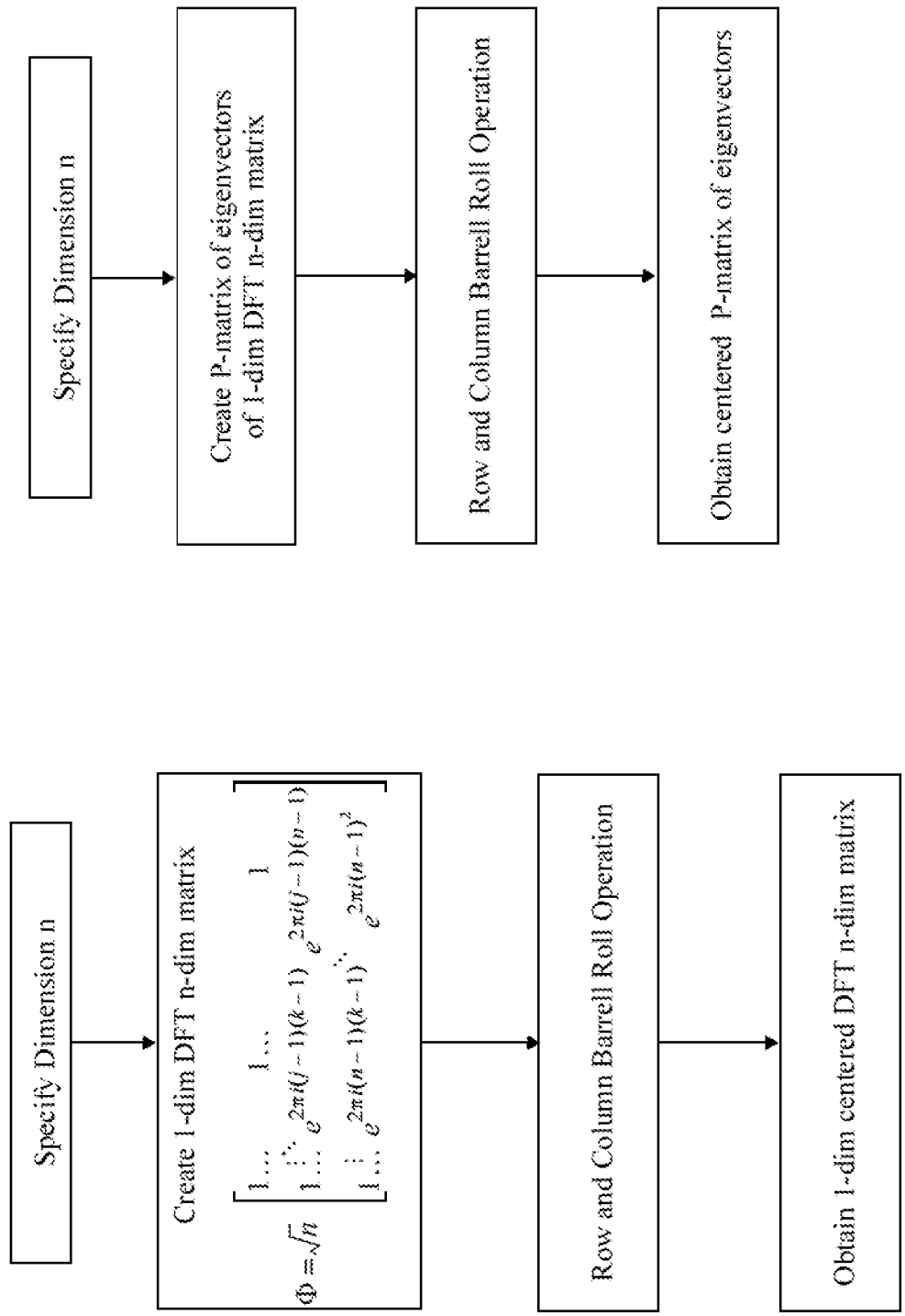
FIG. 17 depicts this example construction of a 1-dimensional centered fractional discrete Fourier matrix of order n.
FIG. 18 depicts this example construction of the P (eigenvector) matrix associated with a 1-dimensional centered fractional discrete Fourier matrix of order n.

With this establish, the centered DFT matrix of order n (n odd) can be readily calculated on a computer. Further, given a traditional DFT matrix of order n (n odd), the centered DFT matrix can be calculated from it by a barrel shift of (n−1)/2 rows and (n−1)/2 columns. This centering transformation can also be readily calculated on a computer. FIG. 17 depicts this example construction of a 1-dimensional centered fractional discrete Fourier matrix of order n.

Yet further, from the above proof, the eigenvectors of the centered DFT matrix of order n (n odd) can be calculated from the eigenvectors of the DFT matrix of order n by a barrel shift of (n−1)/2 rows and (n−1)/2 columns. FIG. 18 depicts this example construction of the P (eigenvector) matrix associated with a 1-dimensional centered fractional discrete Fourier matrix of order n.

Thus, closed-form eigenvectors for the centered DFT matrix can be obtained by performing a barrel roll operation on each of the closed-form eigenvectors of the traditional DFT matrix. This allows for the creation of a centered 1-dimensional fractional Fourier transform matrix.

For the processing of images, two centered 1-dimensional fractional Fourier transform matrices, each of which can be of different orders, are structured for combined use on the image—for example, utilizing different sets of array indices (one set of indices for each image dimension), a 4-dimensional tensor representation, separate centered 1-dimensional fractional Fourier transform matrix operations for each image dimension, etc.

As a closing remark for this section, it is noted that in the earlier literature that various forms of shifted versions of the DFT matrix have been proposed and studied, for example [44-46], and in some cases the eigenvectors of the shifted DFT have been considered [46]. However, the shifting of DFTs of odd-order to create centered DFTs, or other methods or forms of centered DFTs have not been explicitly treated, and further their essential use in computation optics and optics modeling has not been developed other than in U.S. Pat. No. 7,039,252 filed Nov. 2, 2004 and associated U.S. patent application Ser. No. 12/101,878.

6.2 Orthogonal Eigenvectors within and Among Subspaces

The application provides for closed-form representations of DFT eigenvectors, imposes high-accuracy orthonormalization with algorithms including iterated Gram-Schmidt applications, and provides zero-centering using linear algebra techniques.

The exemplary approach used here is one adapted from the 2001 paper of Matveev [39] which can be used to obtain a complete set of orthogonal eigenvectors for the DFT or order n in closed-form. Alternatively, the approach of Pie, Wen, and Ding published in 2008 [41] could be employed instead of that of [39] as the [41] algorithm also produces a complete set of orthogonal eigenvectors for the DFT or order n in closed-form. As one skilled in the art can readily implement each of these, and the 2008 Pie, Wen, and Ding paper is well-known while the 7-year earlier 2001 Matveev paper is less well-known, the following exemplary approach will be provided here. It is anticipated by the application, however, that alternatively the [41] algorithm or other approach providing a complete set of orthogonal eigenvectors for the DFT or order n in closed-form can be used; accordingly, these alternate approaches are anticipated by and provided for by the application.

There are a few missing details and other issues in the Matveev paper [39]; these are corrected and further explained in the material that follows. Additionally, the Matveev paper [39] employs a DFT definition with matrix elements whose exponential function arguments are positive imaginary multiples of the variables. The main thread of the discussion below follows this definition, and in occasional places the corresponding result for a DFT with matrix elements whose exponential function arguments are negative imaginary multiples of the variables (as in [36]) are provided, It is again noted that there are other approaches towards closed-form expressions for eigenvectors of the DFT, for example [40,42], but many of these pertain to various alternative constructions of the DFT (for example sampling of Hermite functions or Harper functions without regards to aliasing issues) and/or have other implementation challenges.

The four subspaces of the spectral decomposition describe earlier, together with the associated repeated eigenvalues, form a spectral decomposition of the DFT matrix into four projector matrices $\{P_j\}$:

$$\Phi = \sum_{j=0}^{3} i^j P_j$$

The four projector matrices $\{P_j\}$ are given by:

$$P_j = \frac{1}{4}\sum_{k=0}^{3}(-i)^{jk}\Phi^k.$$

More explicitly $$P_0 = \frac{1}{4}\sum_{k=0}^{n=1}\Phi^k$$

$$P_1 = \frac{1}{4}\sum_{k=0}^{n=1}(-i)^k\Phi^k$$

$$P_2 = \frac{1}{4}\sum_{k=0}^{n=1}(-1)^k\Phi^k$$

$$P_3 = \frac{1}{4}\sum_{k=0}^{n=1}(i)^k\Phi^k$$

These can be calculated by a computer as is clear to on skilled in the art. The rank of each projector matrix is given by the multiplicity of its associated eigenvalue. The projector matrices amount to a partitioning of the eigenvectors of the DFT matrix. Following the general spirit of the notation in [39] the eigenvectors for each of the projector matrices $\{P_j\}$ will be respectively denoted by $v(0,m)|_{m \in \{0,\ldots m(1)\}}$ $v(1,m)|_{m \in \{0,\ldots m(i)\}}$ $v(2,m)|_{m \in \{0,\ldots m(-1)\}}$ $v(3,m)|_{m \in \{0,\ldots m(-i)\}}$ Using properties of the projector matrices, for example as described in [39], these eigenvector representations can be analytically determined in a way that can be evaluated on a computer. In the approach of [39], these can be given by $$v_j(k,m) = \frac{1}{4}\left(\delta_{jm} + (-1)^k\delta_{n-j,m}\frac{q^{jm}}{\sqrt{n}} + (-i)^k\frac{q^{jm}}{\sqrt{n}} + (-i)^{3k}\frac{q^{-jm}}{\sqrt{n}}\right)$$

where $$\delta_{k,j} = \begin{cases} 1 & \text{if } j = k \\ 0 & \text{if } j \neq k \end{cases}$$

Each of the four subspaces eigenvectors can be calculated as:

$$v_j(0,m) = \frac{1}{4}\left(\delta_{jm} + \delta_{n-j,m} + \frac{2}{\sqrt{n}}\cos\left(\frac{2\pi mj}{n}\right)\right),$$

$$v_j(1,m) = \frac{1}{4}\left(\delta_{jm} + \delta_{n-j,m} + \frac{2}{\sqrt{n}}\cos\left(\frac{2\pi mj}{n}\right)\right),$$

$$v_j(2,m) = \frac{1}{4}\left(\delta_{jm} + \delta_{n-j,m} + \frac{2}{\sqrt{n}}\cos\left(\frac{2\pi mj}{n}\right)\right),$$

$$v_j(3,m) = \frac{1}{4}\left(\delta_{jm} + \delta_{n-j,m} + \frac{2}{\sqrt{n}}\cos\left(\frac{2\pi jm}{n}\right)\right).$$

Figure 19:
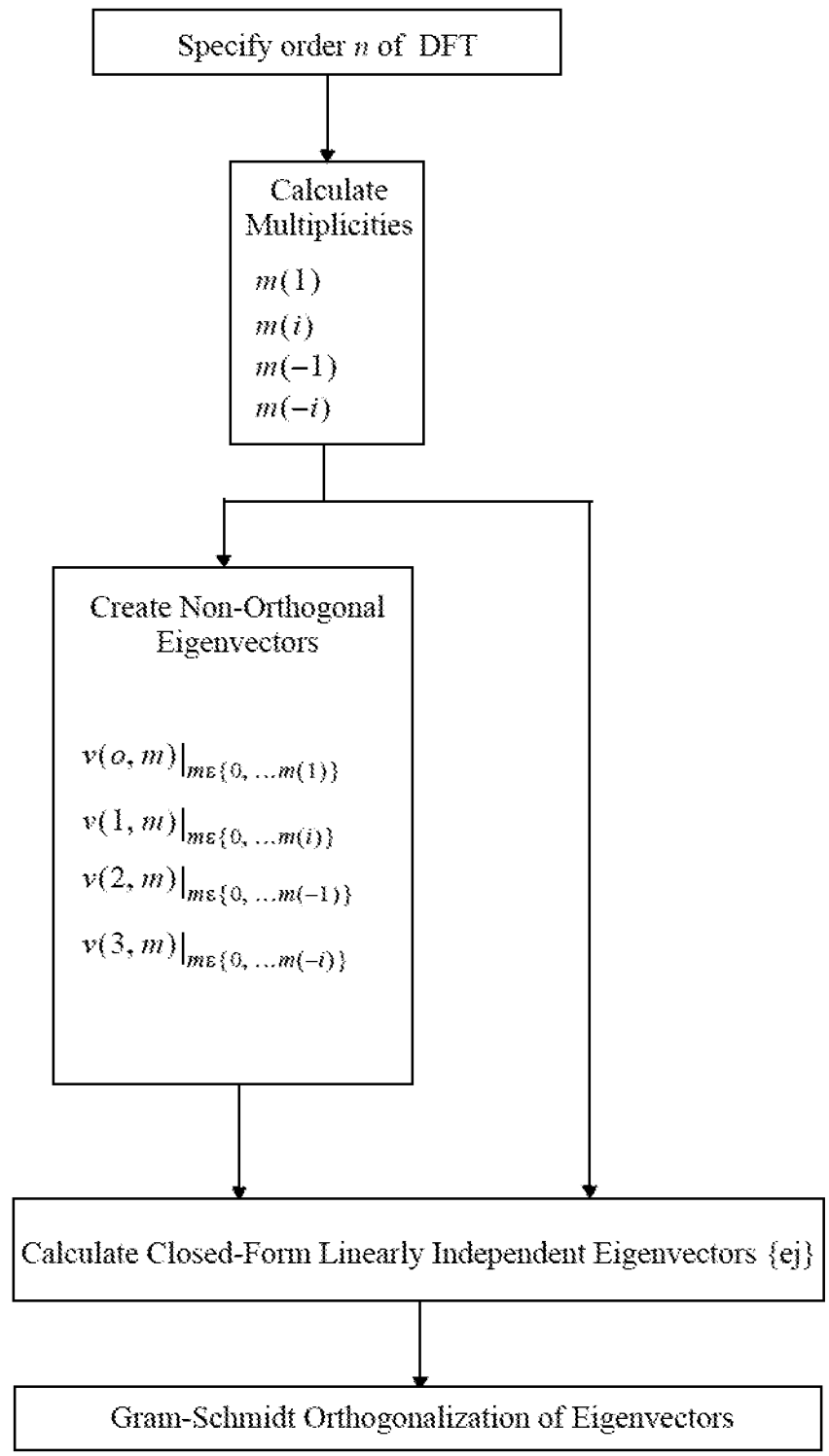
FIG. 19 depicts an exemplary closed-form rendering of linearly dependent eigenvectors of the DFT matrix or order n.

This procedure is summarized in FIG. 19.

For a DFT with matrix elements whose exponential function arguments are negative imaginary multiples of the variables (as in [36]), the corresponding eigenvector representations can be given:

$$v_j(k,m) = \frac{1}{4}\left(\delta_{jm} + (-1)^k\delta_{n-j,m}\frac{q^{jm}}{\sqrt{n}} + (i)^k\frac{q^{jm}}{\sqrt{n}} + (i)^{3k}\frac{q^{-jm}}{\sqrt{n}}\right)$$

and the general form of the procedure summarized in FIG. 19 can be used.

The eigenvectors thus far are linearly independent, fully span their respective subspaces, and collectively span the range of the DFT matrix. However, they are not orthogonal. There are at least two approaches to orthogonalizing the complete collection of linearly independent eigenvectors provided:

The first approach employs the use of the Gram-Schmidt procedures. This is actually suggested in Matveev's paper ([39] page 641) for orders less than or equal to 4. However, especially for a DFT matrix or order greater roughly 100 or larger, even high-quality numerical Gram-Schmidt algorithm improve but hardly make a noticeable step in improving the orthogonality of the eigenvector collection; thus the direction of the inequality may well be a typo. Regardless, the next section practically addresses this by employing iterated applications of a Gram-Schmidt algorithm.

The second approach employs an analytical construction of the orthogonality utilizing Gramian calculations employing the evaluation of determinants. These can be calculated on a computer, readily so for languages or numerical processors that provide a primitive function for the numerical evaluation of determinants.

These are considered in the next two subsections.

6.2.1 Iterated Gram-Schmidt

The application provides for high-accuracy orthonormalization with algorithms including iterated applications of a Gram-Schmidt algorithm. In one approach, the eigenvectors are first subjected to a linear independence test as a precautionary check. This can, for example, be done by evaluating the determinant of the matrix of eigenvalues. In some implementations, for example where linear independence is deemed as ensured, this linear independence confirmation step can be skipped. Next each eigenvector is normalized by dividing each element by the scalar quantity obtained from the inner product or the vector with itself. In another implementation such normalization can be deferred or skipped altogether.

Next, the normalized (or non-normalized) collection of eigenvectors are provided to an iterative loop providing one or more applications of a high-performance Gram-Schmidt algorithm. For example, in each iteration, the high-performance Gram-Schmidt algorithm is applied to a current collection of eigenvectors. After the application of the algorithm, pairwise inner products are taken among all the resulting vectors produced by the application of the Schmidt algorithm, and each inner product is used in a metric of orthogonality. For example, a metric of orthogonality can simple sum together the values produced by each of the pairwise inner products. The value of the metric of orthogonality is compared to a threshold, and if the threshold is exceeded those vectors are subjected to a next application of the Gram-Schmidt algorithm. It is found, for example, to obtain good degrees of orthogonality for collections of n linearly independent eigenvectors (each comprising n elements) for a DFT of order n, with n or the order of 100-200, some 9 to 12 iterations minimum can be needed, even with a high performance Gram-Schmidt algorithm performed with precision math.

In one example implementation, each of the four subspaces is separately processed by the iterative Gram-Schmidt algorithm, motivated by the fact that each of the subspaces are by construction mutually orthogonal. In another example, all of the eigenvectors are collectively processed by the iterative Gram-Schmidt algorithm.

Figure 20:
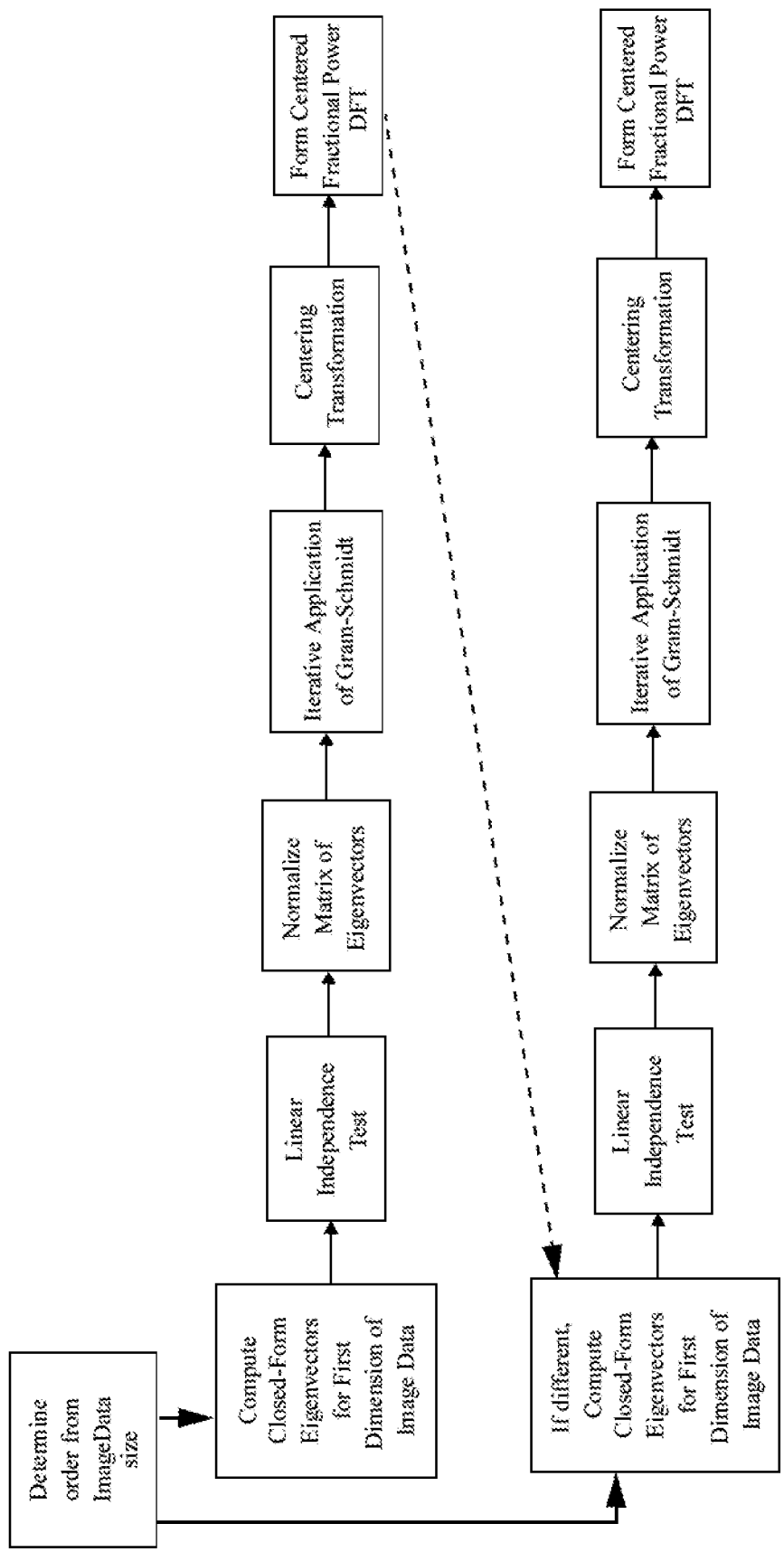
FIG. 20 provides an example path through iterated applications of a Gram-Schmidt algorithm for each image dimension, the application of the centering operations, and construction of the two 1-dimensional discrete fractional Fourier transform matrices.

An example path through iterated applications of a Gram-Schmidt algorithm for each image dimension, the application of the aforedescribed centering operations, and construction of the two 1-dimensional discrete fractional Fourier transform matrices is provided in FIG. 20. Other approaches are of course possible as is clear to one skilled in the art; these are anticipated and provided for by the application.

6.2.2 Analytically Constructed Orthogonality

On pages 641-642, Matveev [39] provides an analytical construction imposing orthogonality on the complete collection of linearly independent eigenvectors utilizing Gramian calculations employing the evaluation of determinants. These can be calculated on a computer, readily so for languages or numerical processors that provide a primitive function for the numerical evaluation of determinants.

For cases where k is odd (i.e., k=1 or k=3), the associated closed-form eigenvectors are calculated via the Gramian formulas $$e_1(k) = v(0, k),$$

$$e_2(k) = \begin{vmatrix} p_{00}(k) & v(0, k) \\ p_{10}(k) & v(1, k) \end{vmatrix}$$

...

$$e_{m(k)}(k) = \begin{vmatrix} p_{00} & \cdots & p_{0,m_k-1} & v(0, k) \\ \vdots & \cdots & \cdots & \vdots \\ p_{m_k-2,0} & \cdots & p_{m(k)-2,m(k)-2} & v(m(k)-2, k) \\ p_{m(k)-1} & \cdots & p_{m(k)-1,m(k)-2} & v(m(k)-1, k) \end{vmatrix}$$

For where k is even (i.e., k=0 or k=2), the associated closed-form eigenvectors are calculated via the Gramian formulas $$e_1(k) = v(1, k),$$

$$e_2(k) = \begin{vmatrix} p_{11}(k) & v(1, k) \\ p_{21}(k) & v(2, k) \end{vmatrix}$$

...

$$e_{m(k)}(k) = \begin{vmatrix} p_{11} & \cdots & p_{1,m_k} & v(1, k) \\ \vdots & \cdots & \cdots & \vdots \\ p_{m_k-1,1} & \cdots & p_{m(k)-1,m(k)-1} & v(m(k)-1, k) \\ p_{m(k)} & \cdots & p_{m(k)-1,m(k)-1} & v(m(k), k) \end{vmatrix}$$

Figure 21:
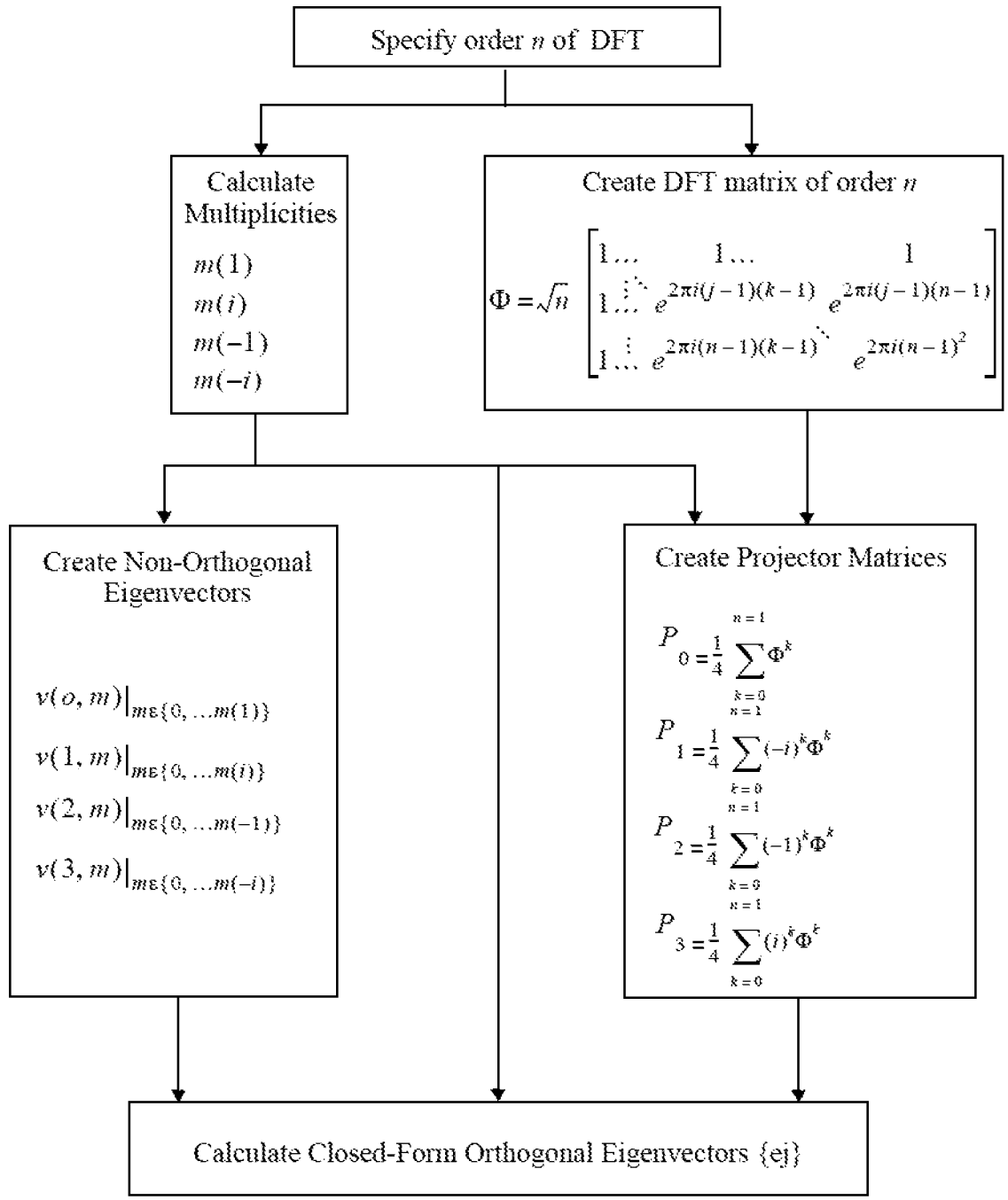
FIG. 21 depicts an exemplary closed-form rendering of orthogonal eigenvectors of the DFT matrix or order n.

This procedure is summarized in FIG. 21.

In one example implementation the orthogonality of the resulting analytically produced orthogonal eigenvectors is improved further by one or more applications of a Gram-Schmidt algorithm. Here, FIG. 20 provides an example path through iterated applications of a Gram-Schmidt algorithm for each image dimension, the application of the aforedescribed centering operations, and construction of the two 1-dimensional discrete fractional Fourier transform matrices. The two centered 1-dimensional fractional Fourier transform matrices, each of which can be of different orders, are structured for combined use on the image—for example, utilizing different sets of array indices (one set of indices for each image dimension), a 4-dimensional tensor representation, separate centered 1-dimensional fractional Fourier transform matrix operations for each image dimension, etc.

In one approach to the above example implementations, each of the four subspaces could separately processed by the iterative Gram-Schmidt algorithm, motivated by the fact that each of the subspaces are by construction mutually orthogonal. In another example, all of the eigenvectors are collectively processed by the iterative Gram-Schmidt algorithm.

Figure 22:
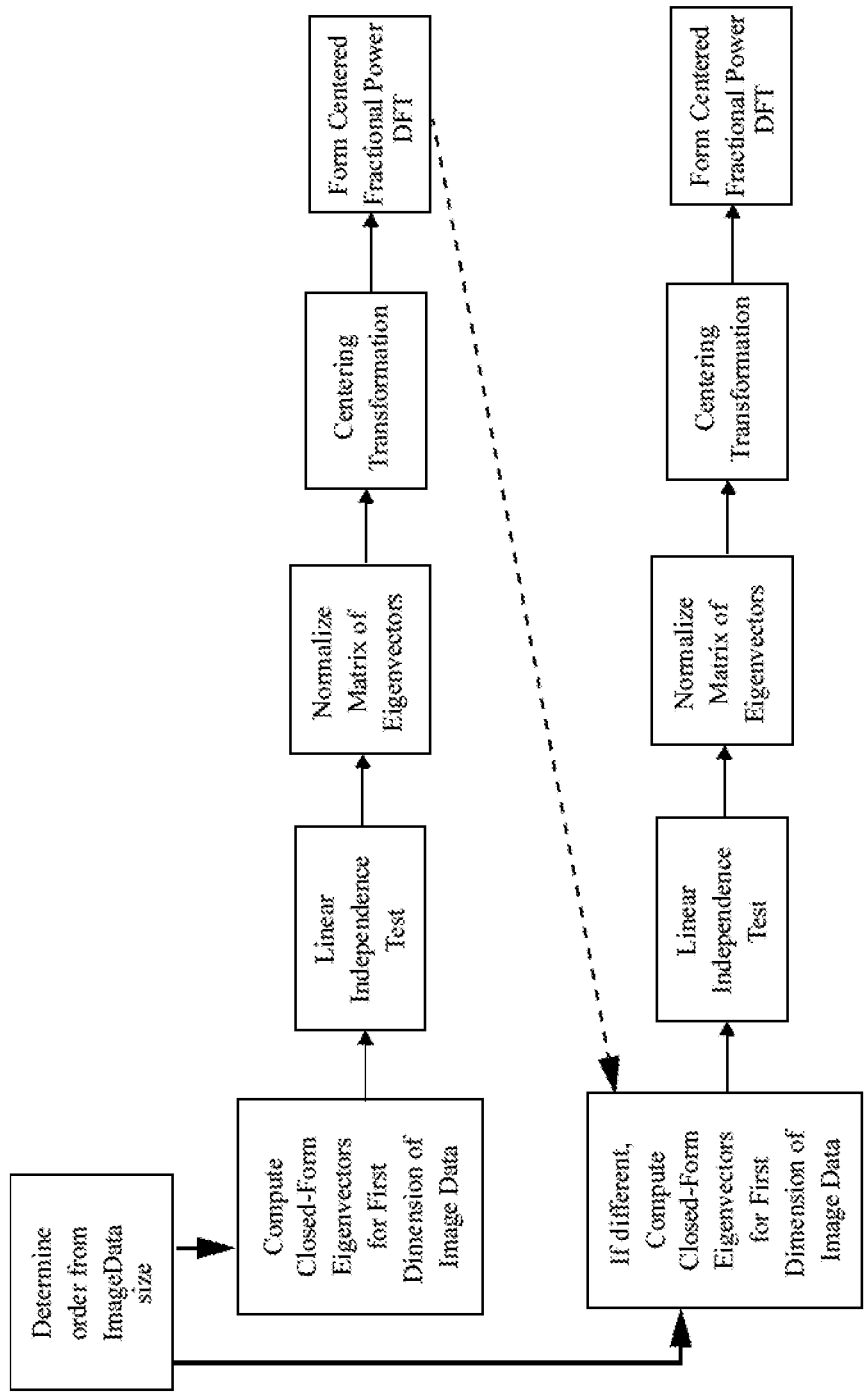
FIG. 22 provides an example path through iterated applications of a Gram-Schmidt algorithm for each image dimension, the application of the centering operations, and construction of the two 1-dimensional discrete fractional Fourier transform matrices.

In another example implementation the orthogonality of the resulting analytically produced orthogonal eigenvectors is deemed adequate. For this case, FIG. 22 provides an example path through iterated applications of a Gram-Schmidt algorithm for each image dimension, the application of the aforedescribed centering operations, and construction of the two 1-dimensional discrete fractional Fourier transform matrices.

In either case, the two centered 1-dimensional fractional Fourier transform matrices, each of which can be of different orders, are structured for combined use on the image—for example, utilizing different sets of array indices (one set of indices for each image dimension), a 4-dimensional tensor representation, separate centered 1-dimensional fractional Fourier transform matrix operations for each image dimension, etc.

7. Mis-Focus Correction Using a Numerical Processor

The focus correction technology and theory has described in a sequence of issued patents and pending patent applications by the inventor, including U.S. Pat. Nos. 6,687,418;

7,054,504; 7,203,377; 7,039,252; 7,627,195; 7,697,777 and pending U.S. patent application Ser. Nos. 12/101,878 and 12/754,587. FIG. 9 and FIG. 10 collectively depict an exemplary design for a focus correction system in keeping with the descriptions provided earlier. As shown and suggested in FIG. 5 and FIG. 8, all operators involved are invertible and thus, with iteration-defined phase restoration applied to the stored original image, all transformations in the chain to the original image are invertible and thus there is no information loss.

Figures 23, 24:
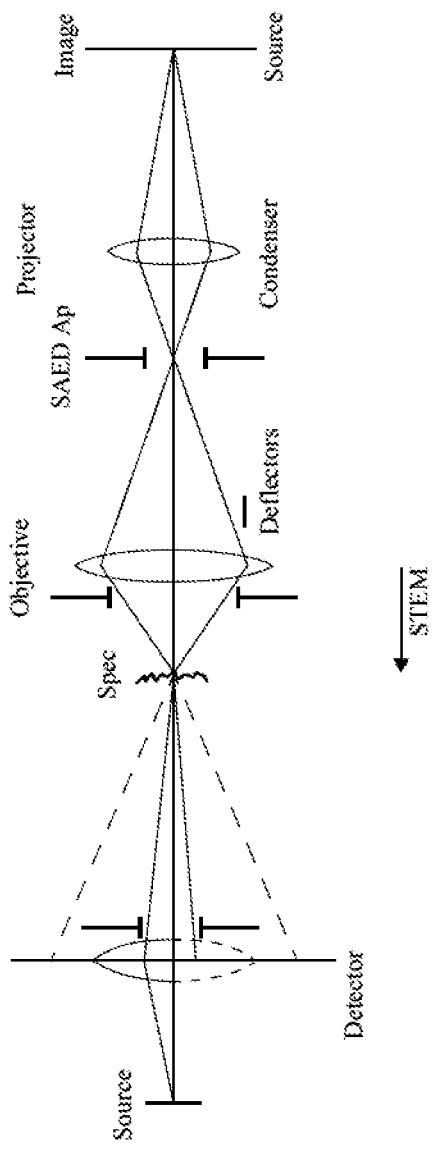
FIG. 23 depicts the general framework for iteratively applying the real or imaginary values of the power variable α.
FIG. 24 depicts representations of both a CTEM and a STEM electron microscope.

FIG. 23 depicts the general framework for iteratively applying the real or imaginary values of the power variable $\alpha$. As described earlier, the underfocus and overfocus procedures can be combined in various ways. For example, a first one or more iterations for the underfocus case can be tried using small real positive values of a, and then one or more iterations for the overfocus case can be tried using small real negative values of g (equivalent to small imaginary values of a). In one approach, the underfocus trials complete and then the overfocus trials are started. In another approach, underfocus trials and overfocus trials are interleaved.

7.1 Underfocus Case

As discussed above, the fractional Fourier transform for all real-values of the power $\alpha$ is indeed an operator group. As such every element in the group has an inverse. This is used as follows:

If the coherent-radiation image (including its phase information) is underfocused, the optical process can be modeled by a power $\alpha_{underfocus}$ of the (fractional) Fourier transform lying between 0 and 2;

By operating on an coherent-radiation underfocused image (including its phase information) with a fractional Fourier transform of power (2-$\alpha$ underfocus), a Fourier transform of power 2 (focus condition) results;

A stored underfocused coherent-radiation image almost assuredly has no usable phase information, but if its mis-focus can be corrected by operating on it with a Fourier transform of power (2-$\alpha$ underfocus), then the underfocused coherent-radiation image must have had a phase condition equivalent to that of a fractional Fourier transform of power $\alpha$ underfocus. This allows for:

a well-defined phase restoration and, in turn as a result a single-parameter iterator that can be used in a hand or automatically adjusted underfocus correction system;

Symmetry and anti-symmetry relations internal to the structure of the fractional Fourier transform provide ways to transform the phase of fractional Fourier transform of power $\alpha$, underfocus into the phase of fractional Fourier transform of power 2-$\alpha$ (underfocus)

Except for very rare contrived pathologies (or mixed depth-of-field artifacts), sharp edges will only result when the focus correction system produces a focused image;

In an automated system, a spatial high-pass filter feeding an energy measurement element can be used to measure the degree of high-frequency energy (corresponding to the degree of sharpness) in the produced image; this can be used as an observer to create an automatic feedback-driven focusing control system.

7.2 Overfocus Case

In the case of an overfocused image, the "field" property of the fractional Fourier transform for complex-valued powers (instead of the group property for a real) is used, i.e.

$$F^{2-\alpha}F^{\alpha}=F^2.$$

where $\alpha$ is real, imaginary, or complex. Since the overfocus condition is equivalent to $F^{2+i\gamma}$ for some unknown negative real value of $\gamma$, the corresponding mis-focus correction would $F^{-i\gamma}$ because $$F^{2+i\gamma}F^{-i\gamma}=F^2.$$

Thus, as described earlier, an iterative procedure or algorithm can be created to close in and converge to a correction in the overfocused case:

Select a small trial negative real-value of $\gamma$

Begin a chain of calculations depending upon $\gamma$:

Calculate $F^{-i\gamma}$ and the phase information of $F^{2+i\gamma}$

Impose the phase information of $F^{2+i\gamma}$ on the recorded image and apply $F^{-i\delta}$ Determine if the mis-focus has been adequately improved If the mis-focus has not been adequately improved, the procedure is complete If the mis-focus has not been adequately improved, select a slightly more negative trial negative real-number value of □ and perform the chain of calculations again.

8. Applicability to Additional Lens-Based Coherent Radiation Imaging Applications Attention is now directed towards the applicability of the previous results to lens-based coherent imaging applications other than laser or transmission electron—for example those of microwave masers (including observational imaging of astronomical masers), coherent x-ray, ion beam "lithography," etc. Lenses or lens-like technologies can be used to implement coherent imaging. A few examples are briefly considered.

Accordingly, the aspects of the application can be applied to used in correcting mis-focus in a stored image produced by a transmission electron microscope (TEM) as discussed earlier in the context of electron beam imaging [9-10]. Aspects of the invention provide for applications to images produced by a traditional TEM as well as other forms of a TEM. Representations of both a CTEM and a STEM electron microscope are shown in FIG. 24, adopted from the book by Buseck, Cowley, and Eyring *High-Resolution Transmission Electron Microscopy*, 1988, Oxford, N.Y., ISBN 0-19504275-1, p. 6 (FIG. 1.2).

Similarly aspects of the invention can be applied to used in correcting mis-focus in a stored image produced by coherent x-ray imaging, for example as taught in [47].

Similarly aspects of the application can be applied to used in correcting mis-focus in a stored image produced by holographic imaging, for example employing holographic lenses as taught in [48].

9. Incoherent Fractional Fourier Optics

Aspects of the application extend selected or adapted capabilities to incoherent radiation imaging. For example, a number of roles for the fractional Fourier transform in incoherent light imaging have been identified [49]. As another example, some types of holography can be performed with incoherent light [50], including several types of Fourier imaging and Fourier spectroscopy. Accordingly, aspects of the application provides for applications in incoherent light imaging and incoherent light holography. Further, in an application, the fractional Fourier mathematical propagation models employed in the present invention are used to provide a mathematical framework for ray tracing geometry in incoherent light imaging arrangements.

10. Applications to Lens-Less Diffraction Imaging

Attention is now directed towards the applicability of the previous results to lens-less diffraction imaging. Diffraction imaging mathematics models are expressed in terms of the fractional Fourier transform.

While aspects of the application has been described in detail with reference to disclosed embodiments, various modifications within the scope of the invention will be apparent to those of ordinary skill in this technological field. It is to be appreciated that features described with respect to one embodiment typically can be applied to other embodiments.

Aspects of the application can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

REFERENCES

[1] Namias, V., "The Fractional Order Fourier Transform and its Application to Quantum Mechanics," *J. of Institute of Mathematics and Applications*, vol. 25, pp. 241-265, 1980.

[2] Ozaktas; Zalevsky, Kutay, *The Fractional Fourier Transform*, Wiley, 2001 (ISBN 0471963461). pp. 117-185 and p. 386.

[3] Ludwig, L. F. "General Thin-Lens Action on Spatial Intensity (Amplitude) Distribution Behaves as Non-Integer Powers of the Fourier Transform," *SPIE Spatial Light Modulators and Applications Conference*, South Lake Tahoe, 1988.

[4] Yu, Frances T. S., *Optical Information Processing*, 1982, John Wiley & Sons, New York (ISBN 0-471-09780-2), pp. 273-282.

[5] Hansen, P. C.; Nagy, J. G.; O'Leary, D. P., *Deblurring Images—Matrices, pectra, and Filtering*, 2006, SIAM, Philadelphia (ISBN 0-89871-618-7), pp. 1-12, 21-32, 97-100, 103-120.

[6] Levi, Applied Optics, Volume 2, (Section 19.2) Wiley, New York, 1980, pp. 779-782.

[7] Goodman, J., Introduction to Fourier Optics, McGraw-Hill, 1968, San Francisco (LCN 07-023776-X), pp. 77-96.

[8] Iizuka, K., *Engineering Optics*, 1987, Springer Verlag, New York (ISBN 0-387-17131-2), pp. 156-157.

[9] Spence, John C. H., *High-Resolution Electron Microscopy*, 2003, Oxford Science Publications, New York (ISBN 0-19-850915-4), pp. 48-57.

[10] Hawkes, P. W., *Electron Optics and Electron Microscopy*, 1972, Taylor & Francis Ltd, London (ISBN 0-850-660564), pp. 124-129 and p. 140.

[11] Wiener, Norbert, *The Fourier Integral And Certain Of Its Applications*, 1968, Dover Publications, New York, (ISBN 0-486-60272-9) pp. 51-70.

[12] Wiener, Norbert, "Hermitian Polynomials and Fourier Analysis," *J. Math. and Phys.* 8 (1929), pp. 70-73.

[13] Condon, E. U., "Immersion of the Fourier Transform in a Continuous Group of Functional Transforms," *Proceedings of the National Academy of Science*, vol. 23, pp. 158-161, 1937.

[14] Kober, "Wurzeln aus der Hankel-und Fourier und anderen stetigen Transformationen," *Quart. J. Math. Oxford Ser*, vol. 10, 1939, pp. 45-49.

[15] Bargmann, V., "On a Hilbert Space of Analytic Functions and an Associated Integral Transform, Part I," *Communications on Pure and Applied Mathematics*, vol. 14, pp. 187-214, 1961.

[16] Mustard, D., "Lie Group Embeddings of the Fourier Transform and a New Family of Uncertainty Principles," *Miniconferences on Harmonic Analysis and Operator Algebras, (Canberra, 1987), Proceedings of the Centre for Mathematical Analysis*, Austrailian National University, v. 16, ISBN 0-86784-519-8.

[17] K. Wolf, "Canonical Transforms. I—Complex Linear Transforms," *Journal of Mathematical Physics*, vol. 15, no., pp. 1295-1301, August 1974.

[18] K. Wolf, *Integral Transforms in Science and Engineering*, Wiley, New York, 1979, (ISBN 0-306-39251-8), pp. 379-444.

[19] McBride, A. C.; Kerr, F. H., "On Namias' Fractional Fourier Transforms," *IMA J. of Applied Mathematics*, vol. 39, no. 2, pp. 159-175, 1987.

[20] Kerr, F. H., "A Distributional Approach to Namias' Fractional Fourier Transforms," *Proceedings of the Royal Society of Edinburgh*, vol. 108A, pp. 133-143, 1988.

[21] Folland, G. B., *Harmonic Analysis in Phase Space*, 1989, Princeton University Press, New York (ISBN 0-691-08527-7), pp. 236-239.

[22] Hua, J.; Liu, L.; Li, G., "Extended fractional Fourier transforms," *J. Opt. So. Am. A*, vol. 14, no. 12, December 1997, pp. 3316-3322.

[23] Chountasis, S.; Vourdas, A.; Bendjaballah, "Fractional Fourier Operators and Generalized Wigner functions," *Physical Review A*, vol. 60, no. 5, November 1999.

[24] Shih, C., "Optical Interpretation of a Complex-Order fractional Fourier Transform," *Optics Letters*, vol. 20, no. 10, May 15, 1995.

[25] Bernardo, L.; Soares, O., "Optical Fractional Fourier Transforms with Complex Orders, *Applied Optics*, vol. 35, no. 17, pp. 3163-3166.

[26] Wang, C.; Lu, B., "Complex-Order Fourier Transforms and Their Implementation," *Optik*, vol. 113, no. 8, 202, pp. 337-342.

[27] S.-C. Pei, M.-H. Yeh, and C.-C. Tseng, "Discrete Fractional Fourier Transform Based on Orthogonal Projections", from *IEEE Transactions on Signal Processing*, Vol. 47(#5), IEEE Computer Society Press, 1999.

[28] F. Marinho and L. Bernardo, "Numerical Calculation of Fractional Fourier Transforms with a Single Fast-Fourier-Transform Algorithm," in *J. Opt. Soc. Am. A*., pp. 2111-2116, August 1998.

[29] Bultheel, A.; Sulbaran, H., "Computation of the fractional Fourier transform," *Celestijnenlaan* 200A, B-3001, Leuven, 2004.

[30] Ozaktas; Zalevsky, Kutay, *The Fractional Fourier Transform*, Wiley, 2001 (ISBN 0471963461). pp. 201-221.

[31] J. H. McClellan, and T. W. Parks, "Eigenvalue and Eigenvector Decomposition of the Discrete Fourier Transform", *IEEE Transactions on Audio and Electroacoustics*, vol. au-20, no. 1, pp. 66-74, March 1972.

[32] J. H. McClellan, "Comments on 'Eigenvector and Eigenvalue Decomposition of the Discrete Fourier Transform'", *IEE Transactions on audio and electroacoustics*, pp. 65, February 1973.

[33] R. Yarlagadda, "A Note on the Eigenvectors of DFT Matrices," *IEEE Transactions on Acoustics, Speech, and Signal Processing*, vol. ASSP-25, no. 6, pp. 586-589, December 1977.

[34] Morton, P., "On the Eigenvectors of Schur's Matrix," Journal of Number Theory 12, 122-127, 1980.

[35] J. Makhoul, "On the Eigenvectors of Symmetric Toeplitz Matrices," in *IEEE Transactions on Acoustics, Speech, and Signal Processing*, vol. ASSP-29, no. 4, pp. 868-872, August 1981.

[36] B. W. Dickinson and D. Steiglitz, "Eigenvectors and Functions of the Discrete Fourier Transform," in *IEEE Transactions on Acoustics, Speech, and Signal Processing*, vol. ASSP-30, no. 1, February 1982.

[37] F. A. Grunbaum, in "The Eigenvectors of the Discrete Fourier Transform: A Version of the Hermite Functions," in *J. of Math. Anal. and App.*, vol. 88, pp. 355-363, 1982.

[38] M. L. Mehta, "Eigenvalues and eigenvectors of the finite Fourier transform," *J. Math. Phys.*, vol. 28, no. 4, pp. 781-785, April 1987.

[39] Matveev, V., "Intertwining Relations between the Fourier Transform and Discrete Fourier Transform, the related Functional Identities and Beyond," *Inverse Problems*, vol. 17, IOP Publishing Ltd., 2001. pp. 633-657.

[40] Tolimiery, R., "The Construction of Orthonormal Bases Diagonalizing the Discrete Fourier Transform," Academic Press, Inc., 1984.

[41] Pei, S.; Wen, C.; Ding, J., "Closed Form Orthogonal DFT Vectors Generated by Complete Generalized Legendre Sequence," IEEE Transactions on Circuits and Systems—I: Regular Papers, vol 55, no. 11, December 2008, pp. 3496-3479.

[42] Bultheel, A.; Sulbaran, H., "Computation of the Fractional Fourier Transform," *Applied and Computational Harmonic Analysis*, vol. 16, no. 3, 2004, pp. 182-202.

[43] Jahne, Bernd., *Digital Image Processing—Concepts, Algorithms, and Scientific Applications*, 1991, Springer Verlag, New York (ISBN 3-540-53782-1), pp. 54-58.

[44] Bonnerot, G.; Bellanger, M., "Odd-Time Odd-Frequency Discrete Fourier Transform for Symmetric Real-Valued Series," *Proceedings of the IEEE*, vol. 64-no. 3, pp. 392-393, March 1976.

[45] Yaroslayskii, L., "Shifted Discrete Fourier Transformations," in *Problems of Information Transmission (Russian Translation)* vol. 15, no. 4, pp. 324-327, April 1980.

[46] Pei, S.; Ding, J., "Eigenfunctions of the offset Fourier, fractional Fourier, and linear canonical transforms," JOSA A, Vol. 20, Issue 3, 2003, pp. 522-532.

[47] Pantell, R. H., et al., "Refractive Lenses for Coherent X-Ray Sources," *Applied Optics*, Vol. 40, Issue 28, pp. 5100-5105.

[48] Guo, Y.; Huang, Q.; Du, J., "Implementation of Fractional Fourier Transform Using Holographic Lens," *SPIE Proceedings, Holographic Displays and Optical Elements II (SPIE Proceedings* vol. 3559), Aug. 4, 1998, pp 71-76.

[49] D. Mendlovic, Z. Zalevsky, N. Konforti, R. G. Dorsch, "Incoherent fractional Fourier transform and its optical implementation", *Applied Optics*, vol. 34. no. 32, pp. 7615-7620, November 1995.

[50] Stroke, G., An introduction to Coherent Optics and Holography, second edition, Academic Press, New York, 1969 (LCN 65-28633), pp. 149-161.

I claim:

1. A method for numerically generating a centered discrete fractional Fourier transform matrix on a computer for use in processing an image, the centered discrete fractional Fourier transform matrix of size N by N where N is an odd integer, the method comprising:

numerically calculating the N eigenvectors of an N by N discrete fractional Fourier transform matrix from a closed-form mathematical formula, the calculation performed on a computer;

performing a barrel shift operation on each of the N eigenvectors to produce N shifted eigenvectors;

performing a Gram-Schmidt orthogonalization procedure on the N shifted eigenvectors to produce a first set of improved-orthogonal shifted eigenvectors, the Gram-Schmidt orthogonalization procedure;

testing the resulting first set of improved-orthogonal shifted eigenvectors for mutually orthogonality performed on the computer;

if the first set of improved-orthogonal shifted eigenvectors does not possess enough mutually orthogonality, applying another Gram-Schmidt orthogonalization procedure on the first set of improved-orthogonal shifted eigenvectors to produce a second set of improved-orthogonal shifted eigenvectors, and testing the resulting second set of improved-orthogonal shifted eigenvectors for mutually orthogonality;

wherein if the first set of improved-orthogonal shifted eigenvectors does not possess enough mutually orthogonality, applying another Gram-Schmidt orthogonalization procedure, and testing the resulting improved-orthogonal shifted eigenvectors for mutually orthogonality, continuing until a resulting set of improved-orthogonal shifted eigenvectors is sufficiently orthogonal, and wherein the resulting set of improved-orthogonal shifted eigenvectors that is sufficiently orthogonal is used to create a centered discrete fractional Fourier transform matrix for use in processing the image.

2. The method of claim 1 wherein the centered discrete fractional Fourier transform matrix is created from matrix multiplication of a first matrix comprising of the resulting set of improved-orthogonal shifted eigenvectors with a second matrix comprising zeros for off-diagonal elements and fractional powers of eigenvalues in the diagonal elements, the eigenvalues ordered in the same order that their corresponding eigenvectors are ordered in the first matrix.

3. The method of claim 2 wherein the centered discrete fractional Fourier transform matrix is created from further matrix multiplication by a third matrix, the third matrix comprising the matrix inverse of the first matrix.

4. The method of claim 1 wherein a measure of orthogonality is used to determine the mutually orthogonality.

5. The method of claim 4 wherein measure of orthogonality comprises the sum of the pairwise inner products of all pairs of eigenvectors.

6. The method of claim 5 wherein the value of the measure of orthogonality is compared to the value of a threshold number, and a set of improved-orthogonal shifted eigenvectors is classified as sufficiently orthogonal if the value of the measure of orthogonality is less than the value of the threshold number.

7. The method of claim 1 wherein two such centered discrete fractional Fourier transform matrices are created, the first associated with the rows of an image array and the second associated with the columns of the image array, and the two centered discrete fractional Fourier transform matrices are combined to create a two-dimensional centered discrete fractional Fourier transform operation.

8. The method of claim 7 wherein two-dimensional centered discrete fractional Fourier transform operation is organized as a 4-dimensional tensor.

9. The method of claim 7 wherein the two-dimensional centered discrete fractional Fourier transform operation is used to correct misfocus in an image by operating on image array data, the image array data representing the image comprising misfocus.

10. The method of claim 1 wherein barrel shift operation is implemented by multiplication of permutation of the N by N identity matrix.

11. A method for numerically generating a centered discrete fractional Fourier transform matrix on a computer for use in processing an image, the centered discrete fractional Fourier transform matrix of size N by N where N is an odd integer, the method comprising:

numerically calculating the N eigenvectors of an N by N discrete fractional Fourier transform matrix from a closed-form mathematical formula, the calculation performed on a computer;

performing a Gram-Schmidt orthogonalization procedure on the N shifted eigenvectors to produce a first set of improved-orthogonal shifted eigenvectors, the Gram-Schmidt orthogonalization procedure performed on the computer;

testing the resulting first set of improved-orthogonal shifted eigenvectors for mutually orthogonality;

if the first set of improved-orthogonal shifted eigenvectors does not possess enough mutually orthogonality, applying another Gram-Schmidt orthogonalization procedure on the first set of improved-orthogonal shifted eigenvectors to produce a second set of improved-orthogonal shifted eigenvectors, and testing the resulting second set of improved-orthogonal shifted eigenvectors for mutually orthogonality;

wherein if the first set of improved-orthogonal shifted eigenvectors does not possess enough mutually orthogonality, applying another Gram-Schmidt orthogonalization procedure, and testing the resulting improved-orthogonal shifted eigenvectors for mutually orthogonality, continuing until a resulting set of improved-orthogonal shifted eigenvectors is sufficiently orthogonal;

wherein the resulting set of improved-orthogonal shifted eigenvectors that is sufficiently orthogonal is subjected to a barrel shift operation on each of the N eigenvectors, resulting in N shifted eigenvectors, and wherein the N shifted eigenvectors are used to create a centered discrete fractional Fourier transform matrix for use in processing the image.

12. The method of claim 11 wherein the centered discrete fractional Fourier transform matrix is created from matrix multiplication of a first matrix comprising of the resulting set of improved-orthogonal shifted eigenvectors with a second matrix comprising zeros for off-diagonal elements and fractional powers of eigenvalues in the diagonal elements, the eigenvalues ordered in the same order that their corresponding eigenvectors are ordered in the first matrix.

13. The method of claim 12 wherein the centered discrete fractional Fourier transform matrix is created from further matrix multiplication by a third matrix, the third matrix comprising the matrix inverse of the first matrix.

14. The method of claim 11 wherein a measure of orthogonality is used to determine the mutually orthogonality.

15. The method of claim 14 wherein measure of orthogonality comprises the sum of the pairwise inner products of all pairs of eigenvectors.

16. The method of claim 15 wherein the value of the measure of orthogonality is compared to the value of a threshold number, and a set of improved-orthogonal shifted eigenvectors is classified as sufficiently orthogonal if the value of the measure of orthogonality is less than the value of the threshold number.

17. The method of claim 11 wherein two such centered discrete fractional Fourier transform matrices are created, the first associated with the rows of an image array and the second associated with the columns of the image array, and the two centered discrete fractional Fourier transform matrices are combined to create a two-dimensional centered discrete fractional Fourier transform operation.

18. The method of claim 17 wherein two-dimensional centered discrete fractional Fourier transform operation is organized as a 4-dimensional tensor.

19. The method of claim 17 wherein the two-dimensional centered discrete fractional Fourier transform operation is used to correct misfocus in an image by operating on image array data, the image array data representing the image comprising misfocus.

20. The method of claim 1 wherein barrel shift operation is implemented by multiplication of permutation of the N by N identity matrix.

* * * * *